US012544520B2

(12) United States Patent
Reinhart et al.

(10) Patent No.: US 12,544,520 B2
(45) Date of Patent: Feb. 10, 2026

(54) AEROSOL DELIVERY DEVICE AND METHOD OF OPERATING THE AEROSOL DELIVERY DEVICE

(71) Applicant: PARI Pharma GmbH, Starnberg (DE)

(72) Inventors: Markus Reinhart, Utting (DE); Matthias Finke, Planegg (DE); Jan Pfrang, Munich (DE); Martin Schlun, Grünwald (DE)

(73) Assignee: PARI Pharma GmbH, Starnberg (DE)

( * ) Notice: Subject to any disclaimer, the term of this patent is extended or adjusted under 35 U.S.C. 154(b) by 968 days.

(21) Appl. No.: 17/413,164

(22) PCT Filed: Dec. 13, 2019

(86) PCT No.: PCT/EP2019/085173
§ 371 (c)(1),
(2) Date: Jun. 11, 2021

(87) PCT Pub. No.: WO2020/120770
PCT Pub. Date: Jun. 18, 2020

(65) Prior Publication Data
US 2022/0062565 A1  Mar. 3, 2022

(30) Foreign Application Priority Data
Dec. 14, 2018 (EP) .................... 18212620

(51) Int. Cl.
*A61M 11/00* (2006.01)
*B05B 12/08* (2006.01)
*B05B 17/00* (2006.01)

(52) U.S. Cl.
CPC .......... *A61M 11/005* (2013.01); *B05B 12/08* (2013.01); *B05B 17/0646* (2013.01); *A61M 2205/0294* (2013.01); *A61M 2205/3389* (2013.01)

(58) Field of Classification Search
CPC ........ A61M 11/005; A61M 2205/0294; A61M 2205/3389; B05B 12/08; B05B 17/0646; G01K 7/20; G01K 7/203
See application file for complete search history.

(56) References Cited

U.S. PATENT DOCUMENTS 3,391,547 A * 7/1968 Kingston .............. G01F 23/263
324/683
5,803,362 A   9/1998 Fraccaroli
(Continued)

FOREIGN PATENT DOCUMENTS

DE   295 01 569 U1   4/1995
DE   199 53 317 C1   2/2001
(Continued)

OTHER PUBLICATIONS

International Search Report and Written Opinion mailed Feb. 10, 2020 in connection with International Application No. PCT/EP2019/085092.
(Continued)

*Primary Examiner* — Colin W Stuart
*Assistant Examiner* — Douglas Y Sul
(74) *Attorney, Agent, or Firm* — Wolf, Greenfield & Sacks, P.C.

(57) ABSTRACT

The invention relates to an aerosol delivery device (A, B) comprising an aerosol generator for generating an aerosol in the aerosol delivery device (A, B). The aerosol generator comprises a membrane (1) and a vibrator (7) which is configured to vibrate a fluid (3) and to aerosolise the fluid (3) by the membrane (1). The aerosol delivery device (A, B) further comprises a fluid reservoir (2) for receiving the fluid (3) to be aerosolised, wherein the fluid reservoir (2) is arranged in fluid communication with the membrane (1). Moreover, the aerosol delivery device (A, B) comprises a controller (10) which is configured to operate the vibrator
(Continued)

(7), by supplying an electrical drive signal to the vibrator (7), so as to vibrate the fluid (3), a phase detector (13) which is configured to detect a phase shift of the drive signal, and an evaluation unit (13a) which is configured to detect the presence of fluid (3) in contact with the membrane (1) and/or in the fluid reservoir (2) on the basis of the phase shift detected by the phase detector (13). Further, the invention relates to a method of operating such an aerosol delivery device (A, B).

15 Claims, 7 Drawing Sheets

(56) References Cited

U.S. PATENT DOCUMENTS

| | | | |
|---|---|---|---|
| 6,546,927 B2 | 4/2003 | Litherland et al. | |
| 6,901,926 B2 | 6/2005 | Yamamoto et al. | |
| 10,244,791 B2 | 4/2019 | Cameron et al. | |
| 10,744,277 B2 * | 8/2020 | Finke | B05B 17/0646 |
| 11,278,683 B2 | 3/2022 | Hetzer et al. | |
| 11,547,822 B2 | 1/2023 | Knoch | |
| 11,839,891 B2 | 12/2023 | Grehan et al. | |
| 11,918,731 B2 | 3/2024 | Porter et al. | |
| 2002/0129813 A1 * | 9/2002 | Litherland | H10N 30/802 |
| | | | 128/200.16 |
| 2004/0045547 A1 | 3/2004 | Yamamoto et al. | |
| 2004/0231665 A1 | 11/2004 | Lieberman et al. | |
| 2006/0102172 A1 * | 5/2006 | Feiner | A61M 15/0085 |
| | | | 128/200.14 |
| 2007/0202051 A1 | 8/2007 | Schuschnig | |
| 2007/0277816 A1 * | 12/2007 | Morrison | B05B 17/0615 |
| | | | 128/200.16 |
| 2009/0056708 A1 | 3/2009 | Stenzler et al. | |
| 2014/0145000 A1 * | 5/2014 | Verschueren | B05B 17/0615 |
| | | | 700/275 |
| 2015/0174348 A1 | 6/2015 | Tunnell et al. | |
| 2015/0231340 A1 * | 8/2015 | Pumphrey | A61M 15/0085 |
| | | | 128/200.16 |
| 2015/0320944 A1 * | 11/2015 | Grehan | B05B 17/0669 |
| | | | 239/102.2 |
| 2016/0310681 A1 * | 10/2016 | Finke | A61M 15/08 |
| 2018/0161525 A1 | 6/2018 | Liu et al. | |
| 2019/0054257 A1 | 2/2019 | Cameron et al. | |
| 2022/0047818 A1 | 2/2022 | Reinhart et al. | |
| 2022/0118198 A1 | 4/2022 | Knoch et al. | |
| 2024/0006654 A1 | 1/2024 | Pytlik et al. | |

FOREIGN PATENT DOCUMENTS

| | | |
|---|---|---|
| DE | 10 2008 054 431 B3 | 6/2010 |
| EP | 0 432 992 A1 | 6/1991 |
| EP | 2 883 564 A1 | 6/2015 |
| WO | WO 89/06657 A1 | 7/1989 |
| WO | WO 92/22315 A1 | 12/1992 |
| WO | WO 95/32992 A1 | 12/1995 |
| WO | WO 00/47623 A1 | 8/2000 |
| WO | WO 2004/039442 A1 | 5/2004 |
| WO | WO 2005/029216 A2 | 3/2005 |
| WO | WO 2006/094796 A1 | 9/2006 |
| WO | WO 2008/029216 A1 | 3/2008 |
| WO | WO 2010/139442 A1 | 12/2010 |
| WO | WO 2015/091356 A1 | 6/2015 |

OTHER PUBLICATIONS

International Preliminary Report on Patentability mailed Jun. 24, 2021 in connection with International Application No. PCT/EP2019/085092.

International Search Report and Written Opinion mailed Feb. 10, 2020 in connection with International Application No. PCT/EP2019/085173.

International Preliminary Report on Patentability mailed Jun. 24, 2021 in connection with International Application No. PCT/EP2019/085173.

* cited by examiner

Fig. 8
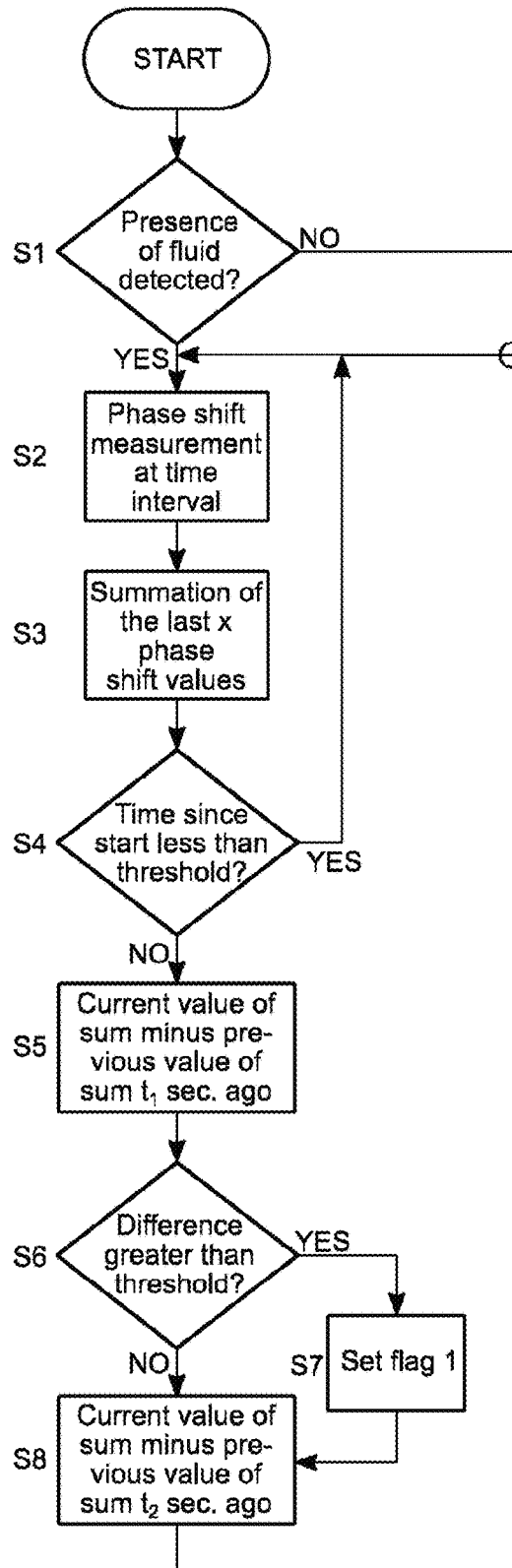
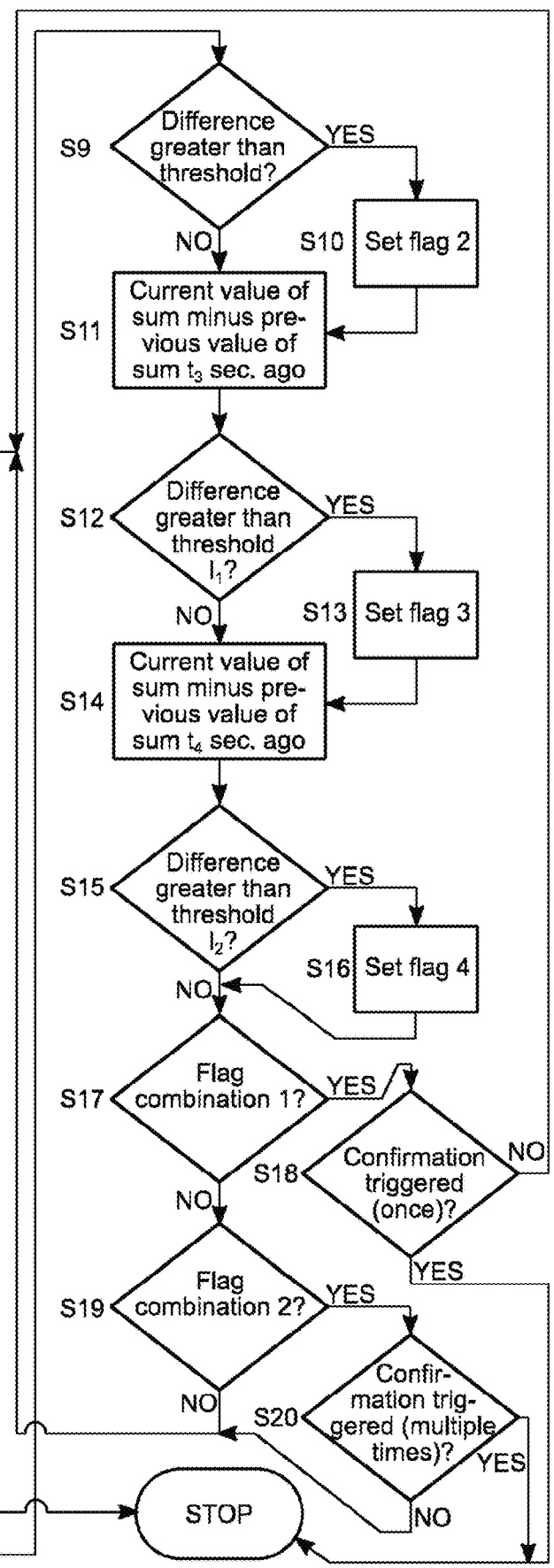

AEROSOL DELIVERY DEVICE AND METHOD OF OPERATING THE AEROSOL DELIVERY DEVICE

RELATED APPLICATIONS

This Application is a national stage filing under 35 U.S.C. 371 of International Patent Application Serial No. PCT/EP2019/085173, filed Dec. 13, 2019, entitled "AEROSOL DELIVERY DEVICE AND METHOD OF OPERATING THE AEROSOL DELIVERY DEVICE". Foreign priority benefits are claimed under 35 U.S.C. § 119 (a)-(d) or 35 U.S.C. § 365 (b) of European application number EP 18212620.1, filed Dec. 14, 2018. The entire contents of these applications are incorporated herein by reference in their entirety.

FIELD OF THE INVENTION

The invention relates to an aerosol delivery device comprising an aerosol generator with a membrane and a vibrator configured to vibrate a fluid and to aerosolise the fluid by the membrane and to a method of operating this aerosol delivery device.

BACKGROUND ART

Aerosols for therapeutic purposes are generated and delivered to a desired location within a user's or patient's body with aerosol delivery devices. A fluid or liquid (i.e., medicament) to be aerosolised or nebulised is supplied to an aerosol generator of the aerosol delivery device, the fluid or liquid is aerosolised or nebulised by the aerosol generator and the resultant aerosol is supplied to the user or patient.

The fluid or liquid may be aerosolised or nebulised in the aerosol generator by a membrane with through holes. The fluid or liquid may be in contact with the membrane via gravitational force or a supply system. The fluid or liquid may be supplied via a supply system, such as a vibratable slide, a vibratable plunger, a vibratable wall and/or a vibratable membrane.

The membrane may be a passive or an active membrane. In the case that the membrane is not vibrated by a vibrator, it is a passive membrane. The passive membrane may include a supply system and have, e.g., a vibrator in contact with a fluid reservoir, a wall, a channel plunger, and/or a supply system.

In the case when the membrane is vibrated by a vibrator, it is an active membrane.

An inhalation nebuliser of the passive membrane type is disclosed in US 6, 901, 926 B2 as well as in US 2004/0045547 A1, which describe, e.g., the nebulisers (inhalers) U1 and U22 from the company Omron. Further inhalation nebulisers of the passive membrane type are disclosed in U.S. 121183747, WO 2006/094796 as well as in US 2009/0056708, which describe the Fox-POP, Medspray and Telemaq nebuliser technology. A further existing aerosol generator with a cantilever concept is disclosed in EP 0432992 A1 from the company Bespak.

An inhalation nebuliser of the active (vibrating) membrane type is disclosed in DE 199 53 317 C1, which describes, e.g., the eFlow inhalation device from the company PARI. The aerosol membrane generator described in this document comprises a cylindrical liquid storage container which is delimited at one end face by a membrane having the shape of a circular disc. A liquid disposed in the liquid storage container contacts the side of the membrane facing the container.

DE 199 53 317 C1 further discloses an oscillation generator, for example, a piezocrystal, which surrounds the membrane in a circular manner and is connected thereto such that the membrane can be caused to oscillate by means of the oscillation generator and an electric drive circuit. The liquid abutting the membrane on the one side is conveyed through holes in the oscillating membrane to the other side of the membrane and is emitted on this side into a mixing chamber as an aerosol.

Known from the utility model DE 295 01 569 is an ultrasonic liquid nebuliser having a piezocrystal which is caused to oscillate electrically by an oscillator circuit, the oscillator circuit being supplied by a power supply device.

DE 295 01 569 discloses an oscillator circuit which comprises a current limiting circuit and which is connected with an electronic temperature limiting circuit that compares a temperature-dependent electric signal occurring at the piezocrystal in a threshold circuit, the comparison signal of which activates a bistable circuit which blocks the oscillator when a limiting temperature in the piezocrystal is reached.

The disclosure of DE 295 01 569 is thereby directed at a protective mechanism for an ultrasonic liquid nebuliser in which the piezocrystal itself causes the liquid to oscillate and is in contact with a comparatively large amount of liquid. The liquid nebuliser described in DE 295 01 569 must furthermore accordingly use large currents in order to cause the large amount of liquid to oscillate.

Constant contact between the piezocrystal and the liquid is necessary owing to these large currents and the resulting large temperature differences in order to prevent destruction of the piezocrystal. If there is no longer any liquid present, the piezocrystal heats up very quickly and is destroyed if the oscillating circuit driving the nebuliser is not switched off immediately.

Only much smaller currents flow in inhalation nebulisers of the type described above, i.e., in inhalation nebulisers having membrane aerosol generators, and therefore only comparatively small temperature differences occur. In such inhalation nebulisers, the lack of liquid does not directly lead to heat-related damage to the piezoelectric elements.

Hence, the use of a protective mechanism such as described in DE 295 01 569 is not necessary in inhalation nebulisers of the type in question here and is not possible either owing to the much smaller currents.

However, it is also desirable in inhalation nebulisers having a membrane generator to reliably detect the presence of a liquid to be nebulised. This is because, on the one hand, the basis for a complete dosage delivery and high dosage accuracy could be thereby created and, on the other hand, it is possible to reliably indicate the end of a therapy session to the patient. Normally it is desired to generate aerosol from the whole liquid to ensure the inhalation therapy success. In particular, an early end of the therapy session, with remaining liquid in the reservoir, should be avoided. In addition, when adherence to therapy is monitored with a patient in telemedicine applications, the signal provides assurance that the entire liquid volume and dose has been nebulised and delivered. Furthermore, by immediately switching off or disconnecting the inhalation therapy device, it is possible, for example, to save power, e.g., increasing the lifetime of a battery.

EP 1 558 315 A1 discloses an inhalation therapy device including a membrane aerosol generator. A detection device is provided for determining whether a liquid to be nebulised is available. Determination of whether liquid is present or not occurs in the detection device by comparing the detected value of an electrical parameter of the membrane aerosol generator with a value for this parameter stored in the detection device. For this purpose, the detection device may use empirically determined values for the detected electrical parameter or a value of the electrical parameter which was detected in a previous cycle. This determination process may be independently and separately performed at different measurement frequencies.

However, this approach of determining the presence of liquid in the membrane aerosol generator is sensitive to the structural details of the membrane aerosol generator, such as the thickness and bonding of the piezo-element, and susceptible to external influences, such as the surface tension, viscosity, density and the temperature of the liquid to be nebulised and the pressure in the liquid reservoir. These factors can affect the determination accuracy, so that the presence or absence of liquid in the membrane aerosol generator may not be reliably identified.

Also WO 2015/091356 A1 discloses an inhalation therapy device with a membrane aerosol generator, having a detection device for determining whether a liquid to be nebulised is available. A controller of the device is configured to sequentially operate a vibrator at a plurality of different vibration frequencies, while a sensor of the device is configured to detect an electrical parameter of the vibrator for each of the plurality of different vibration frequencies. Determination of whether or not liquid is present is performed by the detection device on the basis of the dependence of the detected values of the electrical parameter on the vibration frequency.

This approach allows for the effect of structural details of the aerosol generator on the determination accuracy to be significantly reduced. However, sequentially operating the vibrator at a plurality of different vibration frequencies may require that the aerosol delivery process be repeatedly interrupted, thus impeding continuous device operation.

Hence, there remains a need for an aerosol delivery device and an aerosol delivery method which allow for the presence of fluid or liquid to be aerosolised or nebulised to be efficiently and reliably detected.

SUMMARY OF THE INVENTION

An object of the invention is to provide an aerosol delivery device which enables efficient and reliable detection of the presence of fluid to be aerosolised. Further, the invention aims to provide a method of operating such an aerosol delivery device. These goals are achieved by a device with the technical features of claim 1 and by a method with the technical features of claim 15. Preferred embodiments of the invention follow from the dependent claims.

The invention provides an aerosol delivery device comprising an aerosol generator for generating an aerosol in the aerosol delivery device with a membrane, e.g., a vibratable or oscillatable membrane, and a vibrator, vibration generator or oscillator which is configured to vibrate or oscillate a fluid or liquid and to aerosolise the fluid or liquid by the membrane. The aerosol delivery device further comprises a fluid or liquid reservoir for receiving the fluid or liquid to be aerosolised or nebulised, the fluid or liquid reservoir being arranged in fluid communication with the vibratable membrane, a controller which is configured to operate the vibrator, vibration generator or oscillator, by supplying an electrical drive signal, control signal or control pulse to the vibrator, vibration generator or oscillator, so as to vibrate or oscillate the fluid or liquid, and a phase detector which is configured to detect a phase shift of the drive signal, control signal or control pulse. Moreover, the aerosol delivery device comprises an evaluation unit which is configured to detect or determine the presence of fluid or liquid in contact with the membrane and/or in the fluid or liquid reservoir on the basis of the phase shift detected by the phase detector.

The evaluation unit is configured to detect or determine the presence of fluid or liquid in contact with the membrane and/or in the fluid or liquid reservoir, i.e., the presence of fluid or liquid to be aerosolised in the fluid or liquid reservoir.

If fluid or liquid to be aerosolised is present in the fluid or liquid reservoir, heat, such as Joule heat, generated by the vibrator, e.g., due to the electrical drive signal, control signal or control pulse supplied to the vibrator, is transferred to the fluid or liquid, thus maintaining the vibrator at a substantially constant temperature. If no fluid or liquid to be aerosolised is present in the fluid or liquid reservoir, heat flux is diminished and the vibrator heats up, resulting in an increase of the temperature of the vibrator.

Such a temperature increase of the vibrator causes a change in the impedance of the vibrator, resulting in a phase shift of the electrical drive signal supplied to the vibrator by the controller and the resulting electrical drive signal of the tuned in oscillating circuit. Thus, the presence of fluid in contact with the membrane and/or in the fluid reservoir can be detected or determined on the basis of this phase shift. The temperature increase of the vibrator occurs if no fluid or liquid to be aerosolised is present, substantially independently on the structural details of the aerosol generator, such as the exact configuration of the aerosol generator and production deviations or variations. Hence, this detection or determination process can be performed in a reliable and efficient manner and with a high degree of accuracy.

Moreover, in the process of detecting the phase shift of the drive signal, it is not necessary to vary the vibration frequency, e.g., to operate the vibrator at different vibration frequencies. Aerosol generation does not have to be interrupted and the aerosol delivery device can be operated continuously during phase shift detection. Hence, the time required for aerosol delivery can be reduced, thus improving efficiency of the device. Further, the presence of fluid in contact with the membrane and/or in the fluid reservoir can be detected or determined in a simple way.

Also, there are fluids or liquids, e.g., drugs or medicaments, which are sensitive to interruptions in the aerosolisation process. Using the aerosol delivery device of the present invention, such fluids or liquids can be continuously aerosolised and delivered, ensuring reliable and efficient aerosol treatment.

Therefore, the aerosol delivery device of the invention enables efficient and reliable detection of the presence of fluid or liquid to be aerosolised.

The fluid or liquid reservoir may be arranged for directly receiving the fluid or liquid to be aerosolised. For example, the fluid or liquid reservoir may be configured as a fluid or liquid chamber or container into which a fluid or liquid can be directly filled.

Further, the fluid or liquid reservoir may be arranged for receiving a fluid or liquid containing vessel. In particular, the fluid or liquid reservoir may be designed so that it does not directly receive the fluid or liquid but rather has an opening element, such as a thorn, a spike, a hollow needle or the like, arranged on its inside that opens the fluid containing vessel, e.g., a vial, a blister, an ampoule, a container, a canister, a reservoir, a cartridge, a pot, a tank, a pen, a storage, a syringe or the like, inserted therein.

The evaluation unit may form part of the controller or may be provided as a separate unit or entity. The phase detector may form part of the controller or may be provided as a separate unit or entity. The evaluation unit and the phase detector may be provided as a combined unit or entity or as separate units or entities. The phase detector and/or the evaluation unit may be connected to the controller. The evaluation unit and the phase detector may be connected with each other.

The controller may be any type of controller, e.g., a control unit, a control element, a control circuit or the like, which is capable of operating the vibrator of the aerosol generator by supplying an electrical drive signal thereto. The controller may be connected to the vibrator, e.g., by a wiring or a cable or cables. Alternatively, a cable-free or wireless connection is possible, for example, by inductive coupling.

The aerosol delivery device may be configured so that the process of detecting the presence of fluid to be aerosolised in the fluid reservoir is performed continuously or at discrete time intervals. The former of these two configurations allows for especially reliable and efficient detection.

The aerosol delivery device may be an aerosol generation device, an aerosol inhalation device, a medical aerosol device, an aerosol diagnostic device, an aerosol prophylactic device, an aerosol therapeutic device, an aerosol humidification device, an aerosol therapy device or the like.

The aerosol generator may be a nebuliser, such as a vibrating membrane nebuliser, e.g. an electronic vibrating membrane nebuliser, an atomiser or the like. In particular, the aerosol generator may be an electronic nebuliser, e.g., a piezo-electrically driven nebuliser, i.e., a nebuliser driven by a piezoelectric element. In this case, the piezoelectric element may form part of the vibrator and be arranged for vibrating or oscillating the fluid.

The vibrator may comprise or consist of a piezoelectric element. The controller may be configured to operate the piezoelectric element, by supplying an electrical drive signal to the piezoelectric element, so as to vibrate the fluid or liquid. The phase detector may be configured to detect a phase shift of the drive signal supplied to the piezoelectric element. The evaluation unit may be configured to detect the presence of fluid or liquid in contact with the membrane and/or in the fluid or liquid reservoir on the basis of the phase shift detected by the phase detector.

This configuration allows for a particularly accurate detection of the presence of fluid or liquid to be aerosolised. In particular, if no fluid or liquid to be aerosolised is present in the fluid or liquid reservoir, the temperature of the piezoelectric element increases. This temperature increase causes a change in the impedance of the piezoelectric element, resulting in a phase shift of the electrical drive signal supplied to the piezoelectric element by the controller.

The vibrator or, for example, a piezoelectric element of the vibrator may be arranged at the side of the membrane which is in contact with the fluid or at the opposite side of the membrane, i.e., the side of the membrane to which the fluid is aerosolised. The latter of these two configurations is particularly preferred.

A fluid or liquid to be nebulised or aerosolised by the aerosol generator may be a fluid or liquid for the generation of a pharmaceutical aerosol for the delivery of an active compound.

An active compound is a natural, biotechnology-derived or synthetic compound or mixture of compounds useful for the diagnosis, prevention, management or treatment of a disease, condition or symptom of a mammal, in particular a human.

Other terms which may be used as synonyms of active compounds include, for example, active ingredient, active pharmaceutical ingredient, drug substance, diagnostic material, drug, medicament and the like. The fluid could be of a liquid, solution, suspension, colloidal mixture or liposomal formulation form and can be prepared, mixed or opened before or during the application.

The active compound comprised in the fluid to be nebulised or aerosolised by the aerosol generator may be a drug substance or a medicament which is useful for the prevention, management, diagnosis or treatment of any disease, symptom or condition affecting the body, skin, body cavities, the abdomen, the eyes, the ear, the intestine, the stomach, the nose, the nasal cavities, the sinuses, the osteomeatal complex, the mouth, the trachea, the lungs, upper lungs, lower lungs, central lungs, the bronchia, the bronchioles, the alveoli and/or the respiratory tract. In particular, the aerosol may comprise an active compound which is useful for the prevention, management, diagnosis or treatment of any pulmonary or respiratory disease, symptom or condition. The active compound comprised in the fluid to be nebulised or aerosolised by the aerosol generator may be used especially for clinical trials or regulatory approvals.

Among the active compounds which may be useful for serving one of the purposes named previously and that may be used together with the present invention, are, for example, substances selected from the group consisting of anti-inflammatory compounds, anti-infective agents, antiseptics, prostaglandins, endothelin receptor agonists, phosphodiesterase inhibitors, beta-2-sympathicomimetics, decongestants, vasoconstrictors, anticholinergics, immunomodulators, immunoglobulins, mucolytics, anti-allergic drugs, antihistaminics, mast-cell stabilising agents, tumor growth inhibitory agents, wound healing agents, local anaesthetics, antioxidants, oligonucleotides, peptides, proteins, vaccines, vitamins, plant extracts, cholinesterase inhibitors, vasoactive intestinal peptide, serotonin receptor antagonists, and heparins, glucocorticoids, anti-allergic drugs, antioxidants, vitamins, leucotriene antagonists, anti-infective agents, antibiotics, antifungals, antivirals, mucolytics, decongestants, antiseptics, cytostatics, immunomodulators, vaccines, wound healing agents, local anaesthetics, oligonucleotides, xanthin derived agents, peptides, proteins and plant extracts. Such compound may be used in the form of a suspension, a solution, a colloidal formulation (i.e., liposomal), etc.

Examples of potentially useful anti-inflammatory compounds are glucocorticoids and non-steroidal anti-inflammatory agents such as arformoterole, betamethasone, beclomethasone, budesonide, ciclesonide, dexamethasone, desoxymethasone, fluoconolone acetonide, fluocinonide, flunisolide, fluticasone (propionate), formoterole, fumarate, icomethasone, rofleponide, tiotropium, triamcinolone acetonide, fluocortin butyl, hydrocortisone, hydroxycortisone-17-butyrate, prednicarbate, 6-methylprednisolone aceponate, mometasone furoate, pirfenidone, dehydroepiandrosterone-sulfate (DHEAS), tartrate, umeclidinium, vilanterol, elastane, prostaglandin, leukotriene, bradykinin antagonists, non-steroidal anti-inflammatory drugs (NSAIDs), such as ibuprofen and acetylsalicylic acid (ASA), including any pharmaceutically acceptable salts, esters, isomers, stereoisomers, diastereomers, epimers, solvates or other hydrates, prodrugs, derivatives, or any other chemical or physical forms of active compounds comprising the respective active moieties and combinations thereof, such as for example LABA and *LAMA* combinations like aclidinium and formoterol.

Examples of anti-infective agents, whose class or therapeutic category is herein understood as comprising compounds which are effective against bacterial, fungal, and viral infections, i.e. encompassing the classes of antimicrobials, antibiotics, antifungals, antiseptics, and antivirals, are penicillins, including benzylpenicillins (penicillin-G-sodium, clemizone penicillin, benzathine penicillin G), phenoxypenicillins (penicillin V, propicillin), aminobenzylpenicillins (ampicillin, amoxycillin, bacampicillin), acylaminopenicillins (azlocillin, mezlocillin, piperacillin, apalcillin), carboxypenicillins (carbenicillin, ticarcillin, temocillin), isoxazolyl penicillins (oxacillin, cloxacillin, dicloxacillin, flucloxacillin), and amiidine penicillins (mecillinam);

cephalosporins, including cefazolins (cefazolin, cefazedone); cefuroximes (cefuroxim, cefamandole, cefotiam), cefoxitins (cefoxitin, cefotetan, latamoxef, flomoxef), cefotaximes (cefotaxime, ceftriaxone, ceftizoxime, cefmenoxime), ceftazidimes (ceftazidime, cefpirome, cefepime), cefalexins (cefalexin, cefaclor, cefadroxil, cefradine, loracarbef, cefprozil), and cefiximes (cefixime, cefpodoxim proxetile, cefuroxime axetil, cefetamet pivoxil, cefotiam hexetil), loracarbef, cefepim, clavulanic acid/amoxicillin, Ceftobiprole;

synergists, including beta-lactamase inhibitors, such as clavulanic acid, sulbactam, and tazobactam;

carbapenems, including imipenem, cilastin, meropenem, doripenem, tebipenem, ertapenem, ritipenam, and biapenem;

monobactams, including aztreonam;

aminoglycosides, such as apramycin, gentamicin, amikacin, isepamicin, arbekacin, tobramycin, netilmicin, spectinomycin, streptomycin, capreomycin, neomycin, paromoycin, and kanamycin;

macrolides, including erythromycin, clarythromycin, roxithromycin, azithromycin, dithromycin, josamycin, spiramycin and telithromycin;

gyrase inhibitors or fluroquinolones, including ciprofloxacin, gatifloxacin, norfloxacin, ofloxacin, levofloxacin, perfloxacin, lomefloxacin, fleroxacin, garenoxacin, clinafloxacin, sitafloxacin, prulifloxacin, olamufloxacin, caderofloxacin, gemifloxacin, balofloxacin, trovafloxacin, and moxifloxacin;

tetracyclins, including tetracyclin, oxytetracyclin, rolitetracyclin, minocyclin, doxycycline, tigecycline and aminocycline;

glycopeptides, inlcuding vancomycin, teicoplanin, ristocetin, avoparcin, oritavancin, ramoplanin, and peptide 4;

polypeptides, including plectasin, dalbavancin, daptomycin, oritavancin, ramoplanin, dalbavancin, telavancin, bacitracin, tyrothricin, neomycin, kanamycin, mupirocin, paromomycin, polymyxin B and colistin;

sulfonamides, including sulfadiazine, sulfamethoxazole, sulfalene, co-trimoxazole, co-trimetrol, co-trimoxazine, and co-tetraxazine;

azoles, including clotrimazole, oxiconazole, miconazole, ketoconazole, itraconazole, fluconazole, metronidazole, tinidazole, bifonazole, ravuconazol, posaconazol, voriconazole, and ornidazole and other antifungals, antimycotics, fungicide or fungistatic, such as for example flucytosin, griseofulvin, tolnaftal, naftifin, terbinafin, amorolfin, ciclopiroxolamin, echinocandins, such as micafungin, caspofungin, anidulafungin, amphotericin B or variconazole;

nitrofurans, including nitrofurantoin and nitrofuranzone;

polyenes, including amphotericin B, natamycin, nystatin, flucytosine;

other antibiotics, including tithromycin, lincomycin, clindamycin, oxazolindiones (linzezolids), ranbezolid, streptogramine A+B, pristinamycin A+B, Virginiamycin A+B, dalfopristin/quinupristin (Synercid), chloramphenicol, ethambutol, pyrazinamid, terizidon, dapson, prothionamid, fosfomycin, fucidinic acid, rifampicin, isoniazid, cycloserine, terizidone, ansamycin, lysostaphin, iclaprim, mirocin B17, clerocidin, filgrastim, formycin, pentamidine, and Fab-I-Inhibitors;

antivirals, including aciclovir, ganciclovir, birivudin, valaciclovir, zidovudine, didanosin, thiacytidin, stavudin, lamivudin, zalcitabin, ribavirin, nevirapirin, delaviridin, trifluridin, ritonavir, saquinavir, indinavir, foscarnet, amantadin, podophyllotoxin, vidarabine, tromantadine, and proteinase inhibitors, siRNA based drugs;

antiseptics, including acridine derivatives, iodine-povidone, benzoates, rivanol, chlorhexidine, quarternary ammonium compounds, cetrimides, biphenylol, clorofene, and octenidine;

plant extracts or ingredients, such as plant extracts from chamomile, *hamamelis, echinacea*, calendula, thymian, papain, *pelargonium*, pine trees, essential oils, myrtol, pinen, limonen, cineole, thymol, mentol, camphor, tannin, alpha-hederin, bisabolol, lycopodin, vitapherole;

wound healing compounds, including pirfenidone, dexpantenol, allantoin, vitamins, hyaluronic acid, alpha-antitrypsin, anorganic and organic zinc salts/compounds, salts of bismuth and selen;

antifibrotic compounds, for example, pirfenidone;

interferones (alpha, beta, gamma), tumor necrosis factors, cytokines, interleukines;

immunomodulators, including immunosuppressive compounds, antibody (Ab), cytostatics and metastasis inhibitors;

immunosuppressive compounds, including glucocorticoids, cytostatics, antibodies, drugs acting on immunophilins or other drugs, such as interferons, opioids, TNF binding proteins or mycophenolate;

immunosuppressive compounds, including immunomodulating agents, or immunosuppressive agents or antirejection medications are compounds that may, for example, inhibit or prevent activity of the immune system, for example to prevent graft rejection;

immunosuppressive compounds, including drugs acting on immunophilins, such as ciclosporin, tacrolimus, sirolimus, everolimus, mycophenolic acid, also called mycophenolate or mycophenolate-mofetil, methotrexat, or azathioprine;

antibody (Ab), including polyclonal antibodies or monoclonal antibodies, such as for example immunoglobulin (Ig), immunoglobulin G (IgG), immunoglobulin A (IgA), or immunoglobulin M (IgM); as well as fragments of antibodies, also known as Fab (fragment, antigen-binding) region, complementarity determining regions (CDRs), Fc (Fragment, crystallizable) region, or Fc receptors;

cytostatics and metastasis inhibitors, including chemotherapeutic agents or anti-cancer drugs, such as alkylating agents, antimetabolite, antimicrotubuli agents, anthracyclines, cisplatin, cyclophosphamid, cytoskeletal disruptors (taxanes), epothilones, histone deacetylase inhibitors, ifosfamid, inhibitors of topoisomerase I+II, intercalating agents, kinase inhibitors, mitomycin, nucleotide analogs and precursor analogs, peptide antibiotics, platinum-based agents, retinoids, and *vinca* alkaloids and derivatives;

alkylating agents, such as nimustine, melphanlane, carmustine, lomustine, cyclophosphamide, mechlorethamine, dacarbazine, nitrosoureas, temozolomide (oral dacarbazine), ifosfamide, trofosfamide, chlorambucil, busulfane, treosulfane, prednimustine, thiotepa;

antimetabolites, e.g., cytarabine, fluorouracil, methotrexate, mercaptopurine, tioguanine;

taxane, such as paclitaxel, abraxane, taxotere or docetaxel;

topoisomerase I inhibitors, such as topotecan or irinotecan;

topoisomerase II inhibitors, such as doxorubicin or etoposid;

intercelating agents, such as anthracyclines, like doxorubicin;

platinum-based agents, such as cisplatin, carboplatin, oxaliplatin, or satraplatin;

alkaloids, such as vinblastine, vincristine, vindesine;

antibiotics, such as alcarubicine, bleomycine, dactinomycine, daunorubicine, doxorubicine, epirubicine, idarubicine, mitomycine, plicamycine;

complexes of transition group elements (e.g. Ti, Zr, V, Nb, Ta, Mo, W, Pt) such as carboplatinum, cis-platinum and metallocene compounds such as titanocendichloride;

amsacrine, dacarbazine, estramustine, etoposide, beraprost, hydroxycarbamide, mitoxanthrone, procarbazine, temiposide;

paclitaxel, docetaxel, gefitinib, vandetanib, erlotinib, poly-ADP-ribose-polymerase (PRAP) enzyme inhibitors, banoxantrone, gemcitabine, pemetrexed, bevacizumab, ranibizumab.

Examples of potentially useful mucolytics are DNase, P2Y2-agonists (denufosol), drugs affecting chloride and sodium permeation, such as sodium chloride (NaCl, e.g., 0.9%, 3%, 6%, 7% solutions), ectoine (1,4,5,6-tetrahydro-2-methyl-4-pyrimidinecarboxylic acid), N-(3,5-Diamino-6-chloropyrazine-2-carbonyl)-N'-{4-[4-(2,3-dihydroxypropoxy)-phenyl] butyl} guanidine methanesulfonate (PARION 552-02), heparinoids, guaifenesin, acetylcysteine, carbocysteine, ambroxol, bromhexine, tyloxapol, lecithins, myrtol, surfactant, synthetic surfactant and recombinant surfactant proteins.

Examples of a pulmonary surfactant (derived from: surface active agent), which support pulmonary development, may be an exogenous pulmonary surfactant, or belong to the class of "modified natural" pulmonary surfactants, which are lipid extracts of minced mammalian lung or lung lavage. These preparations have variable amounts of SP-B and SP-C proteins and, depending on the method of extraction, may contain non-pulmonary surfactant lipids, proteins or other components.

Some of the modified natural pulmonary surfactants present on the market, like SurvantaTM, are spiked with synthetic components such as tripalmitin, dipalmitoylphosphatidylcholine and palmitic acid.

Examples of current modified natural pulmonary surfactants include, but are not limited to, bovine lipid pulmonary surfactant (BLESTM, BLES Biochemicals, Inc. London, Ont), calfactant (InfasurfTM, Forest Pharmaceuticals, St. Louis, Mo.), bovactant (AlveofactTM, Thomae, Germany), bovine pulmonary surfactant (Pulmonary surfactant TATM, Tokyo Tanabe, Japan), and beractant (SurvantaTM, Abbott Laboratories, Inc., Abbott Park, Ill.).

Examples of pulmonary surfactants, which may belong to the class of "artificial" pulmonary surfactants, are simply mixtures of synthetic compounds, primarily phospholipids and other lipids that are formulated to mimic the lipid composition and behaviour of natural pulmonary surfactant and are devoid of pulmonary surfactant proteins, are artificial surfactants include, but are not limited to, pumactant (AlecTM, Britannia Pharmaceuticals, UK), and colfosceril palmitate (ExosurfTM, Glaxosmithkline, plc, Middlesex).

Examples of pulmonary surfactants, which may belong to the class of "reconstituted" pulmonary surfactants, are artificial pulmonary surfactants to which have been added pulmonary surfactant proteins/peptides isolated from animals or proteins/peptides manufactured through recombinant technology such as those described in WO 95/32992, or synthetic pulmonary surfactant protein analogues such as those described in WO 89/06657, WO 92/22315 and WO 00/47623, are reconstituted surfactants include, but are not limited to, poractant alfa (CurosurfTM Chiesi Farmaceutici S.p.A.) and lucinactant (SurfaxinTM, Windtree Therapeutics, Inc., Warrington, Pa.) and the product having the composition disclosed in WO 2010/139442.

Examples of potentially useful vasoconstrictors and decongestants which may be useful to reduce the swelling of the mucosa are phenylephrine, naphazoline, tramazoline, tetryzoline, oxymetazoline, fenoxazoline, xylometazoline, epinephrine, isoprenaline, hexoprenaline, and ephedrine.

Examples of potentially useful local anaesthetic agents include benzocaine, tetracaine, procaine, lidocaine and bupivacaine.

Examples of potentially useful antiallergic agents or anti-asthma compounds include the afore-mentioned glucocorticoids, cromolyn sodium, nedocromil, cetrizin, loratidin, montelukast, roflumilast, ziluton, omalizumab, heparinoids and other antihistamins, including azelastine, cetirizin, desloratadin, ebastin, fexofenadin, levocetirizin, loratadin.

Examples of potentially useful anticholinergic agents include ipratropium bromide, tiotropium bromide, oxitropium bromide, glycopyrrolate.

Examples of potentially useful beta-2-sympathicomimetic agents include salbutamol, fenoterol, formoterol, indacaterol, isoproterenol, metaproterenol, salmeterol, terbutaline, clenbuterol, isoetarine, pirbuterol, procaterol, ritodrine and long-acting beta-agonists (LABAs) such as Albuterol sulphate, formoterol fumarate, salmeterol xinafoate, arformoterol tartrate, and olodaterol.

Examples of potentially useful muscarinic antagonists are muscarine and nicotine, such as ipratropium bromide and acetylcholine as well as long-acting muscarinic antagonists (*LAMA*) such as aclidinium (bromide), glycopyrronium (bromide), ipratropium, tiotropium (bromide), and umeclidinium (bromide).

Examples of xanthine derived agents include theophylline, theobromine, caffeine.

Examples of PDE5-Inhibitors include sildenafil.

Examples of antisense oligonucleotides are short synthetic strands of DNA (or analogs) that are complimentary or antisense to a target sequence (DNA, RNA) designed to halt a biological event, such as transcription, translation or splicing. The resulting inhibition of gene expression makes oligonucleotides dependent on their composition useful for the treatment of many diseases and various compounds are currently clinically evaluated, such as ALN-RSV01 to treat the respiratory syncytical virus by, AVE-7279 to treat asthma and allergies, TPI-ASM8 to treat allergic asthma, 1018-ISS to treat cancer. Examples of potentially useful peptides and proteins include antibodies against toxins produced by microorganisms, antimicrobial peptides such as cecropins, defensins, thionins, and cathelicidins.

Examples of radioactive agents for diagnoses or clinical trials are technetium 99m [Tc99, Technegas, Technetium (99mTc), Technetium-99 (99Tc)], krypton (81mKr) inhalation gas, and Xenon-133 [Xenon Xe-133]. A number of isotopes, such as iodine-131 (1311), phosphorous-32 (32P), strontium-90 (90Sr), and yttrium-90 (90Y), may be used. Especially for a pulmonary ventilation and blood perfusion (V/Q) diagnose scan or scintigraphic pulmonary deposition studies the isotopes, krypton (81mKr) inhalation gas or technetium 99m (99mTc), may be used.

Examples of potentially useful opioids are endogenous opioids, opium alkaloids and derivatives, synthetic opioids, allosteric modulators, and opioid antagonists.

The aerosol generator, such as a nebuliser, may be used with fluids or liquids of the groups of viral gene therapy agents or non-viral gene therapy agents. The transferred nucleotide constructs may be single or double stranded DNA, RNA, or siRNA. In one study, the gene therapeutic agent carries especially the CF gene to substitute and cure the cystic fibrosis deficiency. For the transfer to the patient, the substitute is integrated in a viral vector and masked in liposomes. The, from UK CF Gene Therapy Consortium (GTC) called, inhalative gene therapeutic agent "pGM169/GL67A" is under clinical evaluation.

The controller may be configured to operate the vibrator at a substantially constant vibration frequency or at a constant vibration frequency. In particular, the controller may be configured to operate the vibrator at a substantially constant vibration frequency or at a constant vibration frequency during detection of the phase shift of the drive signal by the phase detector. The controller may be configured to operate the vibrator at a substantially constant vibration frequency or at a constant vibration frequency throughout the operation, i.e., the entire operation, of the aerosol delivery device. The controller may be configured to permanently operate the vibrator at a substantially constant vibration frequency or at a constant vibration frequency.

In this manner, temperature variations or fluctuations which may occur at the vibrator in the case of vibration frequency changes are reliably avoided. Hence, the possibility of such temperature variations or fluctuations affecting the detected phase shift can be reliably eliminated, thus achieving a further improvement in detection accuracy.

Further, operating the vibrator at a substantially constant vibration frequency or at a constant vibration frequency enables continuous operation of the aerosol delivery device in a particularly efficient manner, avoiding any interruptions in the aerosol generation and delivery processes.

Alternatively, the controller may be configured to operate the vibrator at different or varying vibration frequencies.

The evaluation unit may be configured to detect the presence of fluid in contact with the membrane and/or in the fluid reservoir on the basis of the phase shift detected by the phase detector during operation of the vibrator at a substantially constant vibration frequency or at a constant vibration frequency.

The drive signal may be determined or measured at the vibrator, e.g., at a piezoelectric element of the vibrator. A voltage component of the drive signal may be the voltage, i.e., the voltage drop, at the vibrator, e.g., at a piezoelectric element of the vibrator, during operation of the vibrator. A current component of the drive signal may be the current at, i.e., the current flowing through, the vibrator, e.g., a piezoelectric element of the vibrator, during operation of the vibrator.

The phase shift of the drive signal may be a current and/or voltage phase shift of the drive signal. In particular, the phase shift of the drive signal may be a phase shift between a current component of the drive signal and a current or voltage component of the drive signal. The phase shift of the drive signal may be a phase shift between a voltage component of the drive signal and a current or voltage component of the drive signal. Such a phase shift provides a particularly accurate measure of an impedance change of the vibrator and can be detected by the phase detector in a simple and reliable manner.

The phase shift of the drive signal may be a phase shift between the drive signal and a reference signal. The phase shift of the drive signal may be a phase shift between a voltage component of the drive signal and a reference signal. The phase shift of the drive signal may be a phase shift between a current component of the drive signal and a reference signal. Also such a configuration allows for a particularly reliable and efficient detection of the presence of fluid.

The reference signal may be a voltage reference signal or a current reference signal. The phase shift of the drive signal may be a phase shift between a voltage component and/or current component of the drive signal and a voltage reference signal. The phase shift of the drive signal may be a phase shift between a current component and/or voltage component of the drive signal and a current reference signal.

The reference signal may be determined at a resistor arranged in electrical connection between controller and vibrator, e.g., between the controller and a piezoelectric element of the vibrator. For example, the reference signal may be the voltage, i.e., the voltage drop, at the resistor during operation of the vibrator, i.e., a voltage reference signal, or the current flowing through the resistor during operation of the vibrator, i.e., a current reference signal.

For example, if the reference signal is a current reference signal, the reference signal may be in the range of 1 to 1000 mA, preferably 5 to 500 mA, even more preferably 10 to 100 mA. If the reference signal is a voltage reference signal, the reference signal may be in the range of 30 to 150 V, preferably 40 to 120 V and more preferably 50 to 90 V, e.g., 50 to 70 V or 80 to 90 V.

The reference signal may be determined at an input of the controller.

The phase detector may be configured to periodically perform detection of the phase shift of the drive signal. In particular, the phase detector may be configured to periodically perform detection of the phase shift of the drive signal at a detection frequency of 0.1 Hz or more, preferably 1 Hz or more, more preferably 10 Hz or more and even more preferably 100 Hz or more. The phase detector may be configured to periodically perform detection of the phase shift of the drive signal at a detection frequency of not more than twice the driving frequency of the aerosol generator, such as a nebuliser, for example, at a detection frequency of 250 kHz or below, preferably 200 kHz or below und even more preferably 150 kHz or below. Herein, the term "detection frequency" defines the number of detection processes, i.e., the number of processes or steps of performing detection of the phase shift of the drive signal, per unit time. By configuring the phase detector in this manner, it can be reliably ensured that the absence of fluid or liquid in contact with the membrane and/or in the fluid reservoir is quickly and efficiently detected.

In some embodiments, the phase detector may be configured to periodically perform detection of the phase shift of the drive signal at a detection frequency of not more than the driving frequency of the aerosol generator, such as a nebuliser, for example, at a detection frequency of 150 kHz or below, preferably 120 kHz or below und even more preferably 100 kHz or below.

In some embodiments, the phase detector may be configured to periodically perform detection of the phase shift of the drive signal at a detection frequency of not more than half of the driving frequency of the aerosol generator, such as a nebuliser, for example, at a detection frequency of 75 kHz or below, preferably 60 kHz or below und even more preferably 50 kHz or below.

In some embodiments, the phase detector may be configured to periodically perform detection of the phase shift of the drive signal at a detection frequency of not more than a thousandth of the driving frequency of the aerosol generator, such as a nebuliser, for example, at a detection frequency of 250 Hz or below, preferably 150 Hz or below und even more preferably 100 Hz or below.

The detection of the phase shift of the drive signal may be periodically performed, e.g., every 4 ms or less frequently.

The detection frequency may have a value which is substantially the same as a value of the vibration frequency of the vibrator or less.

The detection of the phase shift of the drive signal may be repeatedly, e.g., periodically, performed and a mean value, e.g., an arithmetic mean value, of the phase shift values detected in consecutive detection processes may be determined. For example, the mean value, e.g., the arithmetic mean value, may be determined on the basis of the phase shift values detected in 10 or more, 100 or more, 1,000 or more, or 10,000 or more consecutive detection processes.

The evaluation unit may be configured to detect or determine the presence of fluid or liquid in contact with the membrane and/or in the fluid or liquid reservoir on the basis of this mean value, e.g., arithmetic mean value. For example, the presence of fluid or liquid in contact with the membrane and/or in the fluid or liquid reservoir may be determined on the basis of a comparison of the mean value with a previously measured value, e.g., a preceding mean value of the phase shift, or with a fixed value, such as a fixed threshold value.

The phase detector may be configured to periodically perform detection of the phase shift of the drive signal during operation of the vibrator at a substantially constant vibration frequency or at a constant vibration frequency.

The phase detector may be configured to perform detection of the phase shift of the drive signal during aerosolisation of the fluid or liquid by the membrane. Thus, the aerosol delivery device can be operated continuously during phase shift detection, reducing the time required for aerosol delivery.

The evaluation unit may be configured to determine that no fluid in contact with the membrane and/or in the fluid reservoir is present if the phase shift of the drive signal detected by the phase detector exceeds a threshold value. In this way, a particularly reliable and efficient configuration of the aerosol delivery device can be achieved.

The threshold value may be stored in the evaluation unit, e.g., in a memory, such as RAM and/or flash, of the evaluation unit or realized by a discrete circuit.

The evaluation unit may comprise a processor, such as a CPU, a microcontroller and/or an operator, e.g., a comparator, an integrator or the like, which is configured to determine whether the threshold value has been exceeded.

The controller may be configured to deactivate, e.g., automatically deactivate, the vibrator if no presence of fluid in contact with the membrane and/or in the fluid reservoir is detected by the evaluation unit. In this way, a user of the aerosol delivery device is provided with a clear indication that no fluid in contact with the membrane and/or in the fluid reservoir is present. Thus, complete dosage delivery is ensured and the aerosol dosage accuracy is increased, thereby improving the efficiency of the aerosol treatment. Further, by deactivating the vibrator, the power consumption of the aerosol generator can be minimised, e.g., increasing the lifetime of a battery in the aerosol delivery device. This may also improve the patient adherence and patient compliance due to rapid and reliable "end of treatment" indication to the patient or user.

The controller may be configured to output a signal, such as a tactile signal, an audio signal, an optical signal, such as a flashlight, or the like, if no presence of fluid or liquid in contact with the membrane and/or in the fluid reservoir is detected by the evaluation unit. In this way, the user's attention is immediately drawn to the absence of fluid in contact with the membrane and/or in the fluid reservoir.

The aerosol delivery device may comprise an indication signal emitting means. The aerosol delivery device may be configured so that the indication signal emitting means emits an indication signal if the evaluation unit detects that no fluid in contact with the membrane and/or in the fluid reservoir is present. The indication signal may be a tactile signal, an audio signal, an optical signal, such as a flashlight, or the like. The indication signal emitting means may be electrically connected to the phase detector, e.g., via a connecting line. The indication signal emitting means may be electrically connected to the controller or form part of the controller.

The membrane may be a passive membrane. The vibrator may be configured to vibrate a fluid supply system and/or a membrane back space of the aerosol delivery device. Examples of passive membrane aerosol generating systems are, e.g., Omron U1 and Omron U22.

The membrane may be an active membrane, e.g., a vibratable or oscillatable membrane. The vibrator may be configured to vibrate the membrane. Examples of active membrane aerosol generating systems are, e.g., eFlow rapid or other eFlow Technology nebulisers by PARI, Aeroneb Go by Aerogen, InnoSpire Go by Philips and FOX by Vectura.

The aerosol delivery device may further comprise an electrical parameter sensor which is configured to detect at least one electrical parameter of the vibrator.

The at least one electrical parameter may be the voltage and/or the current and/or the power. For example, the at least one electrical parameter may be the current consumption, the current drain, the current draw or the like of the vibrator. The at least one electrical parameter may be the voltage drop or voltage consumption at the vibrator, e.g., at a piezoelectric element of the vibrator. The at least one electrical parameter may be the voltage applied to the vibrator, e.g., by the controller.

Each of these electrical parameters allows for a reliable and efficient detection of the presence of fluid in contact with the membrane and/or in the fluid reservoir. Moreover, these parameters can be detected, sensed or measured in a simple way, e.g., by using one or more current and/or voltage sensors, in a direct or in an indirect sensing method.

The evaluation unit may be configured to detect the presence of fluid in contact with the membrane and/or in the fluid reservoir on the basis of the phase shift detected by the phase detector and of the at least one electrical parameter of the vibrator detected by the electrical parameter sensor. In this way, the detection accuracy can be further enhanced. In particular, the risk of an erroneous determination that no fluid to be aerosolised is present in the fluid reservoir can be minimised or even eliminated.

For example, the evaluation unit may be configured so that, if the evaluation unit determines that no fluid in contact with the membrane and/or in the fluid reservoir is present on the basis of the phase shift detected by the phase detector, this determination is verified or confirmed by detecting the presence of fluid in contact with the membrane and/or in the fluid reservoir on the basis of the at least one electrical parameter of the vibrator detected by the electrical parameter sensor. The evaluation unit may be configured so that only if both of these detection processes yield the result that no fluid in contact with the membrane and/or in the fluid reservoir is present, it is concluded or determined that no fluid to be aerosolised is present in the fluid reservoir.

Alternatively, the evaluation unit may be configured so that these two detection processes are performed in reverse order, i.e., so that detection based on the at least one electrical parameter is carried out first, followed by detection based on the phase shift detected by the phase detector.

The detection process based on the at least one electrical parameter may be performed, e.g., in the manner disclosed in EP 1 558 315 A1 and/or in the manner disclosed in WO 2015/091356 A1.

For example, the controller may be configured so that, when detection on the basis of the at least one electrical parameter is carried out, it sequentially operates the vibrator at a plurality of different vibration frequencies. The electrical parameter sensor may be configured to detect the at least one electrical parameter of the vibrator for each of the plurality of different vibration frequencies. The evaluation unit may be configured to detect the presence of fluid in contact with the membrane and/or in the fluid reservoir on the basis of the dependence of the detected values of the at least one electrical parameter on the vibration frequency.

The aerosol delivery device may further comprise a temperature sensor which is configured to detect a temperature of the vibrator and/or the membrane.

The evaluation unit may be configured to detect the presence of fluid in contact with the membrane and/or in the fluid reservoir on the basis of the phase shift detected by the phase detector and of the temperature of the vibrator and/or the membrane detected by the temperature sensor. In this way, the detection accuracy can be further enhanced. In particular, the risk of an erroneous determination that no fluid to be aerosolised is present in the fluid reservoir can be minimised or even eliminated.

For example, the evaluation unit may be configured so that, if the evaluation unit determines that no fluid in contact with the membrane and/or in the fluid reservoir is present on the basis of the phase shift detected by the phase detector, this determination is verified or confirmed by detecting the presence of fluid in contact with the membrane and/or in the fluid reservoir on the basis of the temperature of the vibrator and/or the membrane detected by the temperature sensor. The evaluation unit may be configured so that only if both of these detection processes yield the result that no fluid in contact with the membrane and/or in the fluid reservoir is present, it is concluded or determined that no fluid to be aerosolised is present in the fluid reservoir.

Alternatively, the evaluation unit may be configured so that these two detection processes are performed in reverse order, i.e., so that detection based on the temperature of the vibrator and/or the membrane detected by the temperature sensor is carried out first, followed by detection based on the phase shift detected by the phase detector.

As has been detailed above, if fluid or liquid to be aerosolised is present in the fluid or liquid reservoir, heat, such as Joule heat, generated by the vibrator, due to the power supplied to the vibrator, is transferred to the fluid or liquid, thus maintaining the vibrator at a substantially constant temperature. If no fluid or liquid to be aerosolised is present in the fluid or liquid reservoir, heat flux is diminished and the vibrator heats up, also resulting in an increase of the temperature of the membrane.

Such a temperature increase of the vibrator and the membrane occurs if no fluid or liquid to be aerosolised is present, substantially independently on the structural details of the aerosol generator, such as the exact configuration of the aerosol generator and production deviations or variations. Thus, the presence of fluid in contact with the membrane and/or in the fluid reservoir can be detected or determined in a reliable and efficient manner and with a high degree of accuracy by using a temperature sensor in the manner detailed above. Further, the presence of fluid in contact with the membrane and/or in the fluid reservoir can be detected or determined in a simple way.

In some embodiments, the aerosol delivery device may further comprise an electrical parameter sensor which is configured to detect at least one electrical parameter of the vibrator and a temperature sensor which is configured to detect a temperature of the vibrator and/or the membrane. In this way, the processes of detecting or determining the presence of fluid in contact with the membrane and/or in the fluid reservoir detailed above can be combined.

The invention further provides a method of operating an aerosol delivery device. The aerosol delivery device comprises an aerosol generator for generating an aerosol in the aerosol delivery device. The aerosol generator comprises a membrane and a vibrator. The vibrator is configured to vibrate a fluid and to aerosolise the fluid by the membrane. The aerosol delivery device further comprises a fluid reservoir for receiving the fluid to be aerosolised, wherein the fluid reservoir is arranged in fluid communication with the membrane. The method comprises the steps of operating the vibrator, by supplying an electrical drive signal to the vibrator, so as to vibrate the fluid, detecting a phase shift of the drive signal, and detecting the presence of fluid in contact with the membrane and/or in the fluid reservoir on the basis of the detected phase shift.

The method of the invention provides the technical effects and advantages already described in detail above for the aerosol delivery device of the invention. In particular, the method enables an efficient and reliable detection of the presence of fluid in contact with the membrane and/or in the fluid reservoir.

The features described above for the aerosol delivery device of the invention also apply to the method of the invention.

The method of the invention may be a method of operating the aerosol delivery device of the invention.

The vibrator may comprise or consist of a piezoelectric element. The method may comprise operating the piezoelectric element, by supplying an electrical drive signal to the piezoelectric element, so as to vibrate the fluid. The method may comprise detecting a phase shift of the drive signal supplied to the piezoelectric element. The presence of fluid in contact with the membrane and/or in the fluid reservoir may be detected on the basis of the detected phase shift of the drive signal supplied to the piezoelectric element.

In the method of the invention, the vibrator may be operated at a constant vibration frequency.

The phase shift of the drive signal may be a current/voltage phase shift of the drive signal.

The phase shift of the drive signal may be a phase shift between a voltage component of the drive signal and a reference signal. The phase shift of the drive signal may be a phase shift between a current component of the drive signal and a reference signal.

The aerosol delivery device may comprise a controller. The controller may be configured to operate the vibrator, by supplying an electrical drive signal to the vibrator, so as to vibrate the fluid. The reference signal may be determined at a resistor arranged in electrical connection between controller and vibrator. The reference signal may be determined at an input of the controller.

In the method of the invention, detection of the phase shift of the drive signal may be periodically performed. In particular, detection of the phase shift of the drive signal may be periodically performed at a detection frequency of 0.1 Hz or more, preferably 1 Hz or more, more preferably 10 Hz or more and even more preferably 100 Hz or more. Detection of the phase shift of the drive signal may be periodically performed at a detection frequency of not more than the driving frequency of the aerosol generator, such as a nebuliser, for example, at a detection frequency of 250 Hz or below, preferably 200 Hz or below und even more preferably 150 Hz or below.

Detection of the phase shift of the drive signal may be performed during aerosolisation of the fluid by the membrane.

The method may further comprise the step of deactivating, e.g., automatically deactivating, the vibrator if no presence of fluid in contact with the membrane and/or in the fluid reservoir is detected.

The method may further comprise the step of outputting an indication signal, such as a tactile signal, an audio signal, an optical signal, such as a flashlight, or the like, if no presence of fluid in contact with the membrane and/or in the fluid reservoir is detected.

BRIEF DESCRIPTION OF THE DRAWINGS

Hereinafter, non-limiting examples of the invention are explained with reference to the drawings, in which:

FIG. 8 shows a flow diagram illustrating an embodiment of the method of operating an aerosol delivery device according to the present invention.

DETAILED DESCRIPTION OF CURRENTLY PREFERRED EMBODIMENTS

Currently preferred embodiments of the present invention will now be described with reference to the accompanying drawings. The preferred embodiments relate to aerosol delivery devices and to methods of operating these devices.

In the following, an embodiment of the aerosol delivery device of the present invention and of the operating method of the present invention will be described with reference to FIG. 1.

Figure 1:
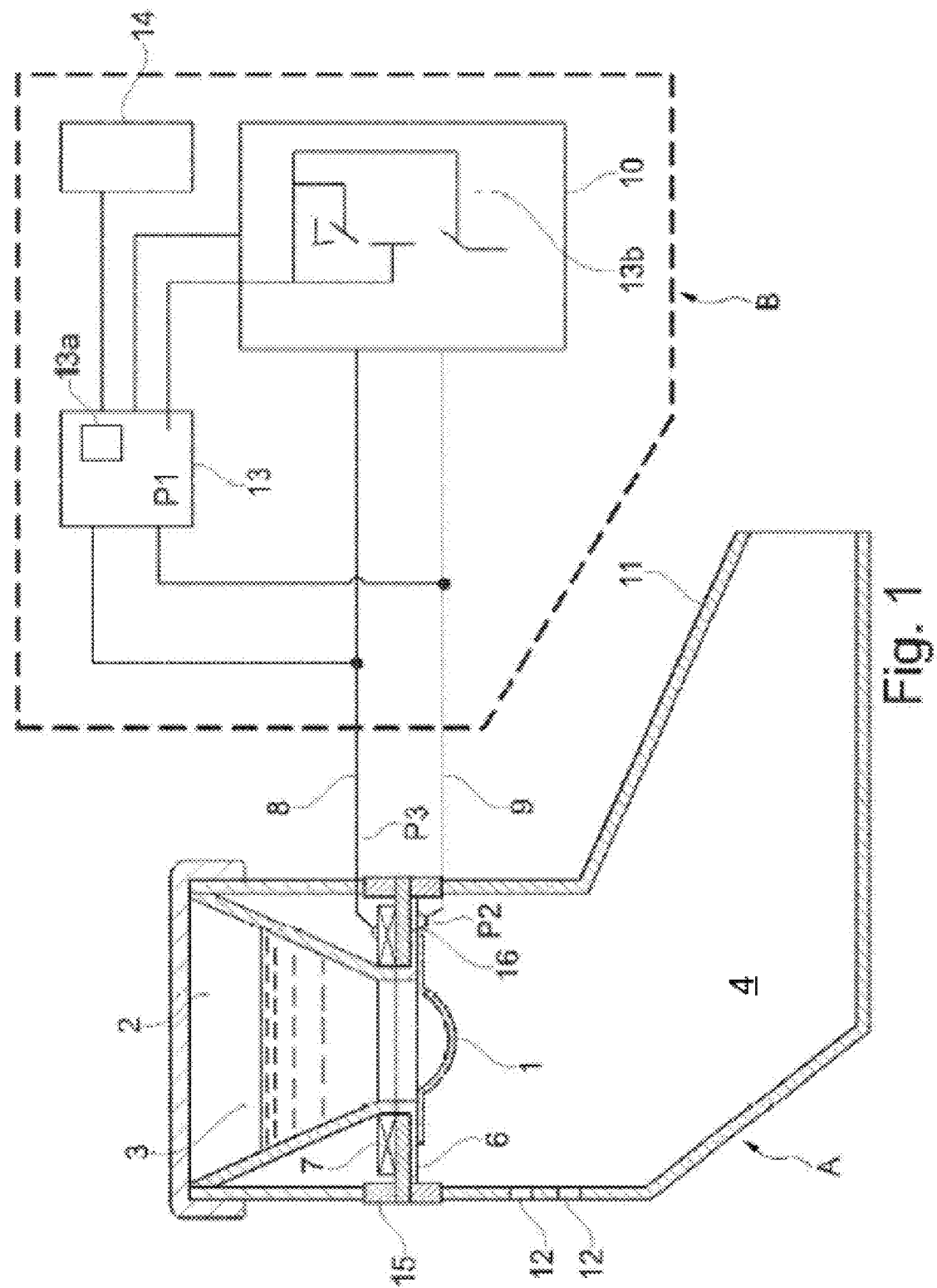
FIG. 1 shows a schematic longitudinally cut cross-sectional view of an aerosol delivery device according to an embodiment of the present invention.

FIG. 1 shows a schematic longitudinally cut cross-sectional view of an aerosol delivery device according to a currently preferred embodiment of the present invention.

The aerosol delivery device comprises an aerosol delivery unit A and a control unit B (see FIG. 1). The aerosol delivery unit A comprises an aerosol generator consisting of a vibratable membrane 1, a support unit 6 and a vibrator 7, e.g., an electromechanical transducer unit, such as a piezoelectric element, which is configured to vibrate the membrane 1. Particularly preferably, the vibrator 7 is a piezoelectric element. The membrane 1 is attached to the support unit 6 which supports the membrane 1 and to which the vibrator 7 is also attached. The aerosol delivery unit A further comprises a fluid reservoir 2 for receiving a fluid 3 to be aerosolised, the fluid reservoir 2 being arranged in fluid communication with the membrane 1. The control unit B comprises a controller 10 which is configured to operate the vibrator 7, by supplying an electrical drive signal to the vibrator 7, so as to vibrate the membrane 1, thereby vibrating and aerosolising the fluid 3. The vibrator 7 is arranged at the side of the membrane 1 which is in contact with the fluid 3, i.e., at the side of the fluid reservoir 2. The controller 10 is configured to operate the vibrator 7 at a constant vibration frequency.

Moreover, the control unit B comprises a phase detector 13 which is configured to detect a phase shift of the drive signal. The detailed arrangement of the phase detector 13 will be described below with reference to FIG. 2.

The control unit B further comprises an evaluation unit 13a which is configured to detect or determine the presence of fluid 3 in contact with the membrane 1 on the basis of the phase shift detected by the phase detector 13.

The controller 10 is electrically connected to the vibrator 7 via connecting lines 8, 9. The controller 10 is configured to supply the electrical drive signal to the vibrator 7 through the connecting lines 8, 9. The connecting lines 8,9 may be formed on a circuit board, e.g., a circuit board comprising a Kapton substrate or the like. The connecting lines 8,9 may be made of a metal, such as copper.

The phase detector 13 is connected to the controller 10 via a separate connecting line, as is shown in FIG. 1. Further, the control unit B comprises an indication signal emitting means 14 for emitting an indication signal, such as a tactile signal, an audio signal, an optical signal or the like, indicating that no fluid in contact with the membrane 1 is present. The indication signal emitting means 14 is electrically connected to the phase detector 13 via a connecting line (see FIG. 1). Alternatively, the indication signal emitting means 14 may be electrically connected to the controller 10.

The membrane 1, the support unit 6 and the vibrator 7 are configured in a rotationally symmetrical manner in the embodiment described here and together form a vibratable or oscillatable structure.

Optionally, the support unit 6 may comprise flexible or elastic support elements 15 and/or flexible or elastic spokes 16, as is shown in FIG. 1.

The support elements 15 may be arranged along the outer circumference of the membrane 1. By providing these support elements 15, the vibratability of the vibratable structure formed by the membrane 1, the support unit 6 and the vibrator 7 can be further enhanced.

The spokes 16 may be arranged so as to extend in radial directions of the membrane 1 and be configured to vibratably hold the membrane 1 in its position. By providing these spokes 16, the vibratability of the vibratable structure formed by the membrane 1, the support unit 6 and the vibrator 7 can be further enhanced.

The controller 10, the phase detector 13, the evaluation unit 13a and the indication signal emitting means 14 are accommodated together in the control unit B. The evaluation unit 13a is integrated with the phase detector 13, i.e., the phase detector 13 and the evaluation unit 13a are provided as a combined unit. Alternatively, the evaluation unit may be integrated with the controller 10, i.e., the controller 10 and the evaluation unit may be provided as a combined unit. Such an alternative combined unit, in which an evaluation unit 13b is integrated with the controller 10, is also indicated in FIG. 1. Further, the phase detector 13, the evaluation unit 13a, 13b and the controller 10 may be combined into a single unit.

The aerosol delivery unit A further comprises a mixing chamber or aerosol cavity 4 in fluid communication with the membrane 1. The mixing chamber or aerosol cavity 4 is arranged on the side of the membrane 1 which is opposite to the membrane side facing the fluid reservoir 2. One or more air holes 12 are provided in the housing of the aerosol delivery device A. A mouthpiece or nosepiece 11 of the aerosol delivery device A is provided in fluid communication with the mixing chamber or aerosol cavity 4.

The mixing chamber or aerosol cavity 4 may contain, e.g., one or more inhalation valves and one or more exhalation valves (not shown). The aerosol generator may produce an aerosol cloud in the mixing chamber or aerosol cavity 4 during the exhalation phase, when the air (fluid) passes through the exhalation valve(s), and accumulate a high aerosol amount in the mixing chamber or aerosol cavity 4 for the next inhalation phase. In this case, the aerosol delivery device works like a breath enhanced device, similar to an aerosol bolus, such as, e.g., disclosed in DE 19953317, EP 1227856, DE 102008054431 or EP 2361108.

In the following, an example of the operation of the aerosol delivery device shown in FIG. 1, exemplifying an embodiment of the method of the invention, will be explained.

The controller 10 supplies an electrical drive signal to the vibrator 7 via the connecting lines 8,9, causing the membrane 1 to vibrate. The fluid 3, e.g., a liquid, stored in the fluid reservoir 2 and abutting the membrane 1 is conveyed through holes or openings (not shown) in the vibrating membrane 1 and thereby aerosolised into the aerosol mixing chamber 4. The aerosol thus provided in the aerosol mixing chamber 4 can be inhaled by a user or patient through the mouthpiece or nosepiece 11 of the aerosol delivery device. In order to supply a sufficient amount of air, ambient air can enter through the one or more air holes 12 into the aerosol mixing chamber 4 during inhalation. Further, the air exhaled by the patient or user can exit from the aerosol mixing chamber 4 through the one or more air holes 12 during exhalation.

If fluid 3 to be aerosolised is present in the fluid reservoir 2, heat, such as Joule heat, generated by the vibrator 7, due to the electrical drive signal, i.e., the power, supplied to the vibrator 7 by the controller 10, is transferred to the fluid 3, thus maintaining the vibrator 7 at a substantially constant temperature. If no fluid 3 to be aerosolised is present in the fluid reservoir 2, heat flux is diminished and the temperature of the vibrator 7 increases. This temperature increase of the vibrator 7 causes a change in the impedance of the vibrator 7, e.g., a change in the impedance of a piezoelectric element of the vibrator 7, resulting in a phase shift of the electrical drive signal supplied to the vibrator 7 by the controller 10. Thus, the presence of fluid 3 in contact with the membrane 1 and in the fluid reservoir 2 can be reliably and efficiently detected on the basis of this phase shift.

The process of detecting a phase shift of the drive signal is carried out by the phase detector 13.

The phase detector 13 may be configured to periodically perform detection of the phase shift of the drive signal, e.g., at a detection frequency of 0.1 Hz or more, preferably 1 Hz or more, more preferably 10 Hz or more and even more preferably 100 Hz or more. The phase detector 13 may be configured to periodically perform detection of the phase shift of the drive signal at a detection frequency of not more than the driving frequency of the aerosol generator, such as a nebuliser, for example 250 Hz or below, preferably 200 Hz or below und even more preferably 150 Hz or below. Particularly preferably, the detection frequency is maximal 170 Hz and preferably approximately 125 Hz.

A mean value, e.g., an arithmetic mean value, of the phase shift values detected in consecutive detection processes may be determined. For example, the mean value, e.g., the arithmetic mean value, may be determined on the basis of the phase shift values detected in 10 or more, 100 or more, 1,000 or more, or 10,000 or more consecutive detection processes. The evaluation unit 13a may be configured to detect or determine the presence of fluid 3 in the fluid reservoir 2 on the basis of this mean value, e.g., arithmetic mean value.

The phase detector 13 periodically performs detection of the phase shift during operation of the vibrator 7 at a constant vibration frequency. Thus, the absence of fluid 3 in the fluid reservoir 2 is quickly and efficiently detected.

The detection frequency may have a value which is substantially the same as the value of the vibration frequency of the vibrator 7 or less.

The phase detector 13 may be configured to perform detection of the drive signal phase shift during aerosolisation of the fluid 3 by the membrane 1. Hence, the aerosol delivery device can be operated continuously during phase shift detection, reducing the time required for aerosol delivery.

The phase shift detection process performed by the phase detector 13 will be described in detail in the following with reference to FIG. 2.

Figure 2:
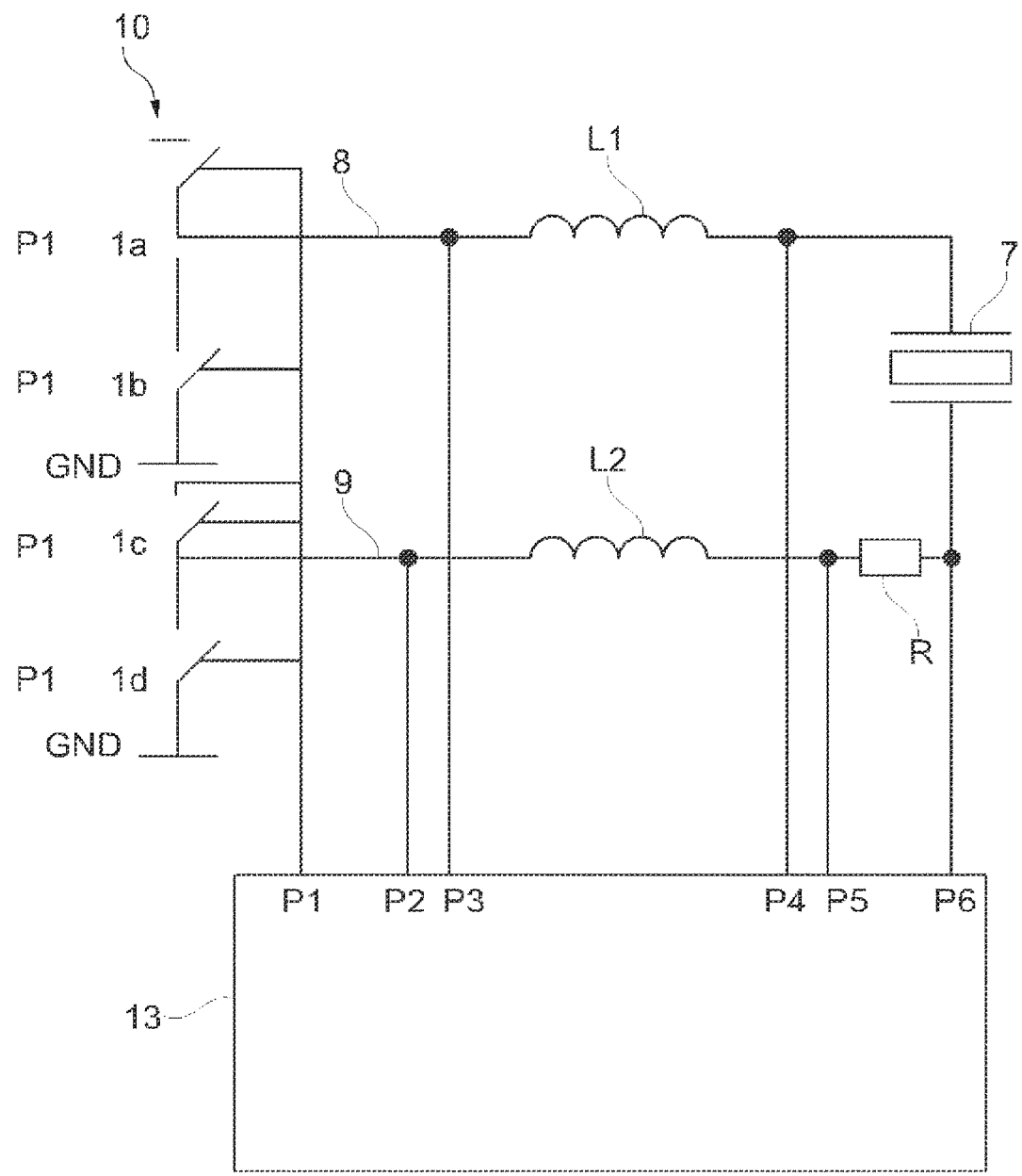
FIG. 2 shows a schematic view of possible arrangements of a phase detector in the aerosol delivery device shown in FIG. 1.

FIG. 2 shows a schematic circuit diagram of a circuit, i.e., an oscillator circuit, formed by the controller 10, the connecting lines 8, 9 and the vibrator 7. The inductance of this oscillator circuit is indicated by two inductors L1 and L2. The vibrator 7 acts as a capacitor, as is also illustrated in FIG. 2. The circuit further comprises a resistor R arranged in electrical connection between controller 10 and vibrator 7, e.g., between the controller 10 and a piezoelectric element of the vibrator 7. The controller 10 has four switches of an H-bridge circuit, namely switches 1a, 1b, 1c and 1d, and two ground terminals GND. The phase detector 13 may be capable of performing detection at six different positions P1, P2, P3, P4, P5 and P6 in the circuit. Detection points may be for example at each of the four switches 1a, 1b, 1c and 1d of the H-bridge circuit (detection position P1), on the connection to the first inductor L1 (detection position P3), between the connection of the first inductor L1 and the vibrator 7 (detection position P4), between the connection of the vibrator 7 and the resistor R (detection position P6), between the connection of the resistor R and the second inductor L2 (detection position P5), or between the connection of the second inductor L2 and the switches 1a, 1b, 1c and 1d or the ground terminals GND (detection position P2). Detection positions P1, P2 and P3 are also indicated in FIG. 1.

The phase shift of the drive signal to be detected by the phase detector 13 may be the phase shift of a voltage component of the drive signal or the phase shift of a current component of the drive signal. In particular, the phase shift of the drive signal may be a phase shift between a voltage component of the drive signal and a reference signal, or the phase shift of the drive signal may be a phase shift between a current component of the drive signal and a reference signal.

The reference signal may be determined at the resistor R, i.e., between the positions P5 and P6 (see FIG. 2). The reference signal may be the voltage, i.e., the voltage drop, at the resistor R during operation of the vibrator 7, i.e., a voltage reference signal, or the current flowing through the resistor R during operation of the vibrator 7, i.e., a current reference signal.

The phase shift of the drive signal may be the phase shift between a voltage component of the drive signal measured between positions P4 and P5 and the above-identified voltage reference signal, i.e., the voltage drop at the resistor R. Alternatively, the phase shift of the drive signal may be the phase shift between a current component of the drive signal measured between positions P4 and P5 and the above-identified current reference signal, i.e., the current flowing through the resistor R during operation of the vibrator 7.

As an alternative to this detection configuration, the reference signal may be determined between the positions P2 and P3 (see FIG. 2).

Alternatively, the phase shift of the drive signal may be detected between any one of the switches 1a, 1b, 1c and 1d of the bridge circuit and positions P4 and P5 or between any one of the switches 1a, 1b, 1c and 1d of the bridge circuit and position P4, P5 or P6.

The evaluation unit 13a which, in the present embodiment, is integrally formed with the phase detector 13 detects the presence of fluid 3 in the fluid reservoir 2 on the basis of the phase shift of the drive signal detected by the phase detector 13. In particular, the evaluation unit 13a may be configured to determine that no fluid 3 is present in the fluid reservoir 2 if the phase shift of the drive signal detected by the phase detector 13 exceeds a threshold value. The threshold value may be stored in the evaluation unit 13a, e.g., in a memory, such as RAM and/or flash, of the evaluation unit 13a. The evaluation unit 13a may comprise a processor, such as a CPU, or the like which is configured to determine whether the threshold value has been exceeded.

If the evaluation unit 13a determines that there is no fluid 3 present in the fluid reservoir 2, the evaluation unit 13a may emit a signal to the controller 10 which, in turn, automatically stops the supply of the drive signal to the vibrator 7, thereby automatically deactivating or switching off the aerosol delivery device.

Alternatively or additionally, the evaluation unit 13a may instruct the indication signal emitting means 14 to emit an indication signal, such as a tactile signal, an audio signal, an optical signal or the like, to indicate to the patient or user that the aerosol delivery device has consumed the fluid 3 stored in the fluid reservoir 2, which signals the end of the aerosol therapy session to the patient or user. In this case, the patient or user may then deactivate or switch off the aerosol delivery device if no automatic deactivation or switch off function is provided in addition to the indication signal output. For example, an audio signal emitted for this purpose may be a short sound signal of 0.5 to 2 seconds in length.

Table 1 shows experimental data obtained for an aerosol delivery device according to the present invention which substantially has the configuration shown in FIG. 1.

TABLE 1

| Sec | Phase Shift | Aerosolisation |
| --- | --- | --- |
| 10 | 126.37° | on |
| 15 | 125.96° | on |
| 20 | 123.35° | on |
| 25 | 135.90° | off |
| 30 | 134.47° | off |
| 35 | 137.26° | off |

The phase shift (see the second column of Table 1) is the phase shift between a voltage component of the drive signal measured between positions P4 and P5 and the above-identified voltage reference signal, i.e., the voltage drop at the resistor R (see FIG. 2). The first column of Table 1 gives the time in seconds ("Sec") over which the aerosol delivery device has been operated. The third column of Table 1 indicates whether a fluid to be aerosolised was present in the fluid reservoir 2 of the device ("Aerosolisation on") or not ("Aerosolisation off").

Figure 3:
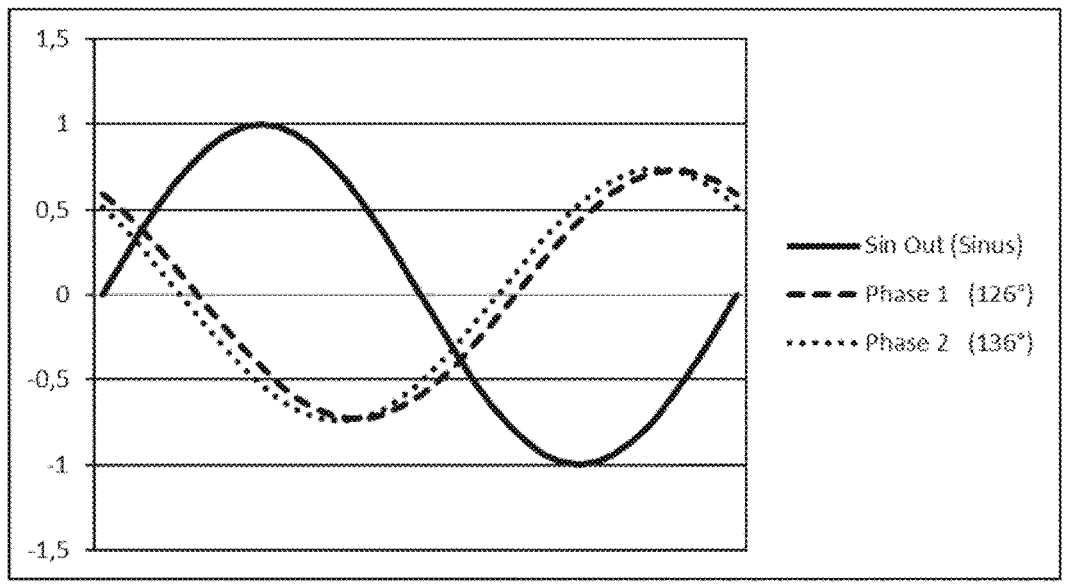
FIG. 3 shows a diagram illustrating phase shifts for two different fill states of the aerosol delivery device.
Figure 4:
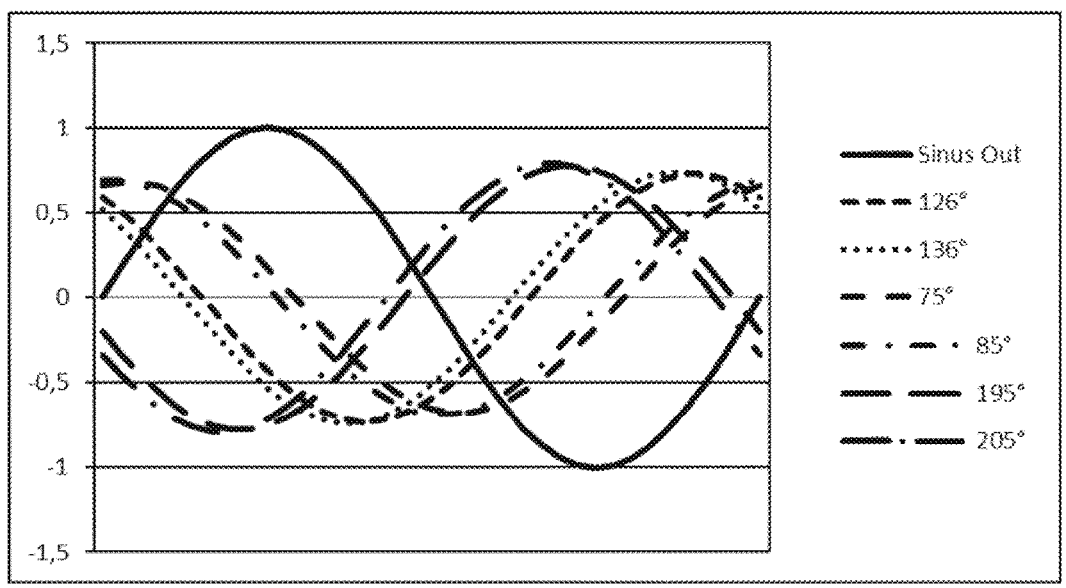
FIG. 4 shows a diagram illustrating phase shifts for two different fill states of the aerosol delivery device for different types of aerosol generator.

The phase shifts given in the first and fourth rows of Table 1, i.e., the phase shifts at operation times of the aerosol delivery device of 10 seconds and 25 seconds, respectively, are also illustrated in FIG. 3. In the diagram of this figure, the voltage component of the drive signal measured between positions P4 and P5 is indicated by a solid line ("Sin Out") and the voltage reference signals for two different fill states of the aerosol delivery device, i.e., with and without fluid being present in the fluid reservoir 2, are indicated by a dashed line ("Phase 1") and a dotted line ("Phase 2"), respectively. At an operation time of 10 seconds, the phase shift between the voltage component of the drive signal measured between positions P4 and P5 (solid line) and the voltage reference signal (dashed line) is approximately 126°, indicating that fluid is present in the fluid reservoir 2. At an operation time of 25 seconds, the phase shift between the voltage component of the drive signal measured between positions P4 and P5 (solid line) and the voltage reference signal (dotted line) is approximately 136°, indicating that no fluid is present in the fluid reservoir 2. The experimental results given in Table 1 show a significant increase in the phase shift of the driving signal of approximately 8° when no more fluid is present in the fluid reservoir 2.

In some embodiments, the change in phase shift of the driving signal when the fluid is exhausted may be +5° or more, +6° or more, +7° or more, +8° or more, +9° or more, +10° or more, +15° or more or +20° or more, respectively. Preferably, this change in phase shift is less than +50°, more preferably less than +35°, even more preferably less than +25° and still more preferably less than +20°.

As is further corroborated by the above data, the phase shift of the drive signal is a sensitive indicator for the presence of fluid or liquid in the fluid reservoir 2. Thus, detecting the presence of fluid or liquid on the basis of this parameter enables reliable and efficient detection with a high degree of accuracy.

As is also shown in Table 1, during operation of the aerosol delivery device with fluid being present in the fluid reservoir 2, the phase shift is in the range of 120° to 130°. In other embodiments, this phase shift may be, for example, in the range of 110° to 130°. For operation of the aerosol delivery device without fluid being present in the fluid reservoir 2, the phase shift given in Table 1 is above 130°. In some embodiments, this phase shift may be, for example, in the range of 130° to 150°.

In further embodiments, the phase shifts may differ for different aerosol generator types from aerosol delivery device A, B. For example, the phase shifts at different operation frequencies for different aerosol generator types are illustrated in FIG. 4. In the diagram of this figure, the voltage component of the drive signal measured between positions P4 and P5 is indicated by a solid line ("Sin Out") and the voltage reference signals for two different fill states, i.e., with and without fluid being present in the fluid reservoir 2, of the first aerosol generator from the first aerosol delivery device A, B are indicated by a dashed line ("126° ") and a dotted line ("136° "), respectively, the voltage reference signals for two different fill states of the second aerosol generator from the second aerosol delivery device A, B are indicated by a dashed line with longer dashes ("75° ") and a dash-dotted line ("85° "), respectively, and the voltage reference signals for two different fill states of the third aerosol generator from the third aerosol delivery device A, B are indicated by a dashed line with even longer dashes ("195° ") and a dash-dotted line with longer dashes ("205° "), respectively.

The experimental results given in FIG. 4 show a significant increase in the phase shift of the driving signal of approximately 7° for the first aerosol generator type from the first aerosol delivery device A, B, a significant increase in the phase shift of the driving signal of approximately 13° for the second aerosol generator type from the second aerosol delivery device A, B and a significant increase in the phase shift of the driving signal of approximately 5° for the third aerosol generator type from the third aerosol delivery device A, B.

In further embodiments, the change in phase shift of the driving signal when the fluid is exhausted may be+5° or more, +6° or more, +7° or more, +8° or more, +9° or more, +10° or more, or +13° or more respectively. Preferably, this change in phase shift is less than +40°, more preferably less than +35°, even more preferably less than +25° and still more preferably less than +20°.

FIG. 5 shows further experimental data obtained for an aerosol delivery device according to the present invention which substantially has the configuration shown in FIG. 1.

In the diagram of FIG. 5, the voltage component of the drive signal measured at detection position P1 (see FIG. 2) is indicated by a solid line. Further, measurements of the voltage drop at the vibrator 7, determined between detection positions P4 and P6 (see FIG. 2) for two different fill states of the aerosol delivery device, are shown.

Specifically, the dash-dotted line in FIG. 5 indicates this voltage drop in a state in which fluid is present in the fluid reservoir 2 and the dashed line in FIG. 5 indicates this voltage drop in a state in which no fluid is present in the fluid reservoir 2.

The presence of fluid in the fluid reservoir 2 is detected on the basis of the phase shift between the voltage component of the drive signal and the voltage drop at the vibrator 7. The voltage component of the drive signal thus serves as a reference signal. The phase shift is determined at the zero-crossing of the measured voltage signals. As is shown in FIG. 5, the phase shift $\Delta\varphi_2$ in the empty state of the aerosol delivery device is significantly larger than the phase shift $\Delta\varphi_1$ in the filled state of the aerosol delivery device. In some embodiments, the voltage signals may be converted into square wave signals prior to determining the phase shifts at the zero-crossing of the signals.

In other embodiments, the presence of fluid in the fluid reservoir 2 may be detected on the basis of the phase shift between a current component of the drive signal and the current flowing through the vibrator 7.

FIG. 6 is a diagram showing the behaviour of the phase shift in the embodiment of FIG. 5 over operating time of the aerosol delivery device. Specifically, this operating time is given on the abscissa of FIG. 6. On the ordinate of FIG. 6, the determined signal, i.e., the phase shifts and the first order derivative of the curve of the detected phase shifts, respectively, is given.

The phase shift, which is indicated by a solid line in FIG. 6, is determined between the voltage component of the drive signal and the voltage drop at the vibrator 7 at the zero-crossing of the measured voltage signals, as has been detailed above. The solid line in FIG. 6 constitutes the curve of the detected phase shifts as a function of or as dependent on the operating time of the aerosol delivery device. The dash-dotted line in FIG. 6 is the first order derivative of the curve of the detected phase shifts and, thus, indicates the slope, i.e., the gradient, of this curve as a function of operating time.

In the region of the diagram of FIG. 6 which is denoted as "end of dose", a sharp increase in the detected phase shift is observed. Accordingly, the first order derivative of the phase shift curve exhibits a narrow peak in this region. This behaviour of the two curves shown in FIG. 6 indicates a transition from a state in which fluid is present in the fluid reservoir 2 to a state in which no fluid is present in the fluid reservoir 2.

For the phase shift measurement illustrated in FIG. 6, the phase shift is repeatedly detected, for example, in the manner detailed above, at a preset time interval. The time interval may be, e.g., in the range of 1 ms to 1 s, preferably 10 ms to 100 ms. For example, the time interval may be 100 ms, so that the phase shift is detected every 100 ms. Alternatively, the time interval may be, e.g., 1 ms, 10 ms or 1s.

The phase shift curve of FIG. 6 shows a portion, namely the end, of an aerosolisation process, including the transition from the state in which fluid is present in the fluid reservoir 2 to the state in which no fluid is present in the fluid reservoir 2. The duration of this portion of the aerosolisation process, i.e., the total width of the abscissa in FIG. 6, may be, for example, in the range of 10 to 200 s, in the range of 30 to 150 s or in the range of 50 to 100 s. For example, the width, along the abscissa, of the squares in the diagram of FIG. 6 may be 1 s or in the range of 5 to 10 s.

In the embodiment of FIGS. 5 and 6, the presence of fluid in the fluid reservoir 2 is detected on the basis of the first order derivative of the curve of the measured phase shifts, i.e., the dash-dotted line shown in FIG. 6. Specifically, it is determined that no fluid is present in the fluid reservoir 2 if this derivative exceeds a threshold value. Examples of this detection process will be explained in further detail below with reference to FIG. 7.

Figure 6:
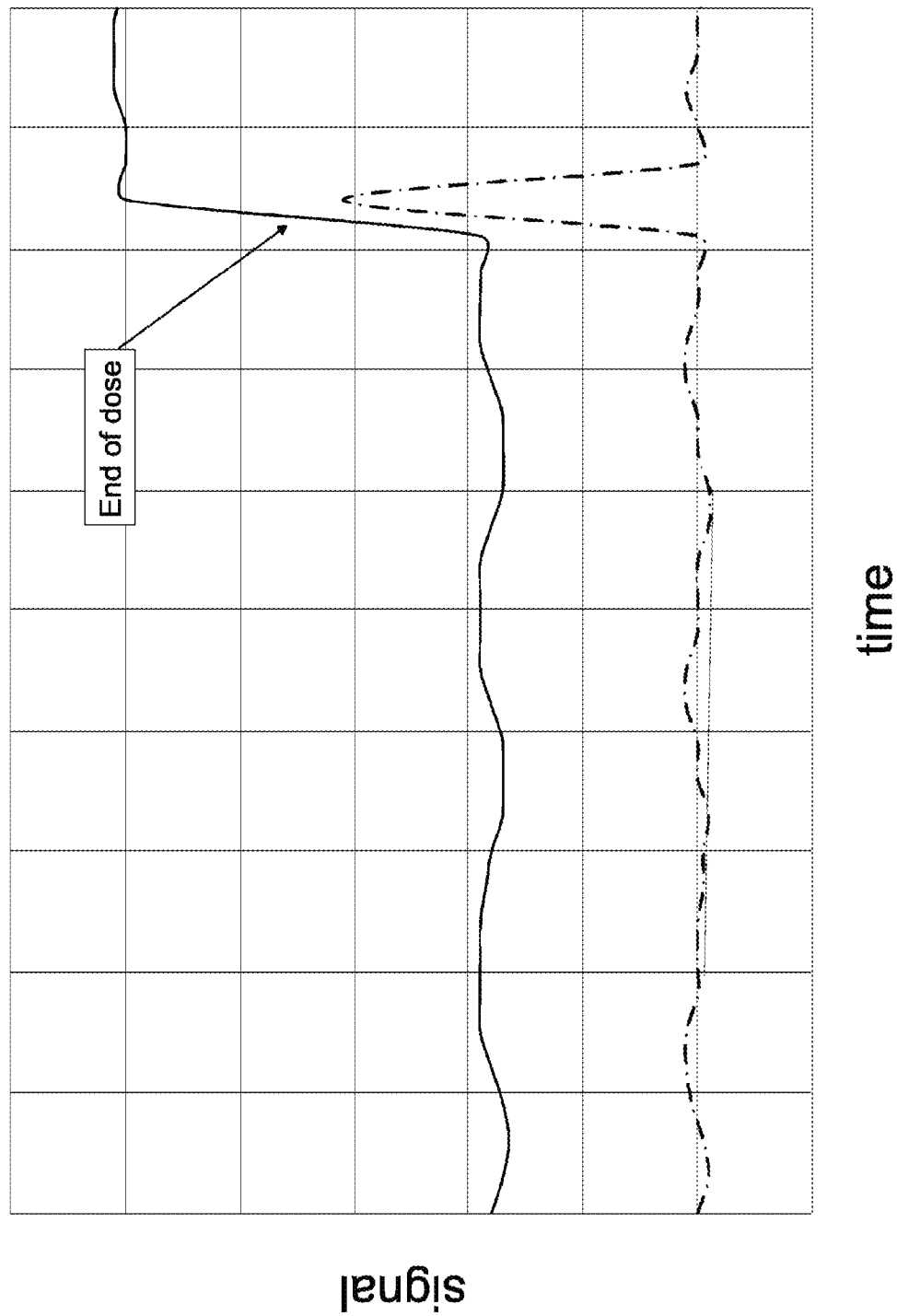
FIG. 6 shows a diagram illustrating the behaviour of the phase shifts shown in FIG. 5 over operating time of the aerosol delivery device.
Figure 7:
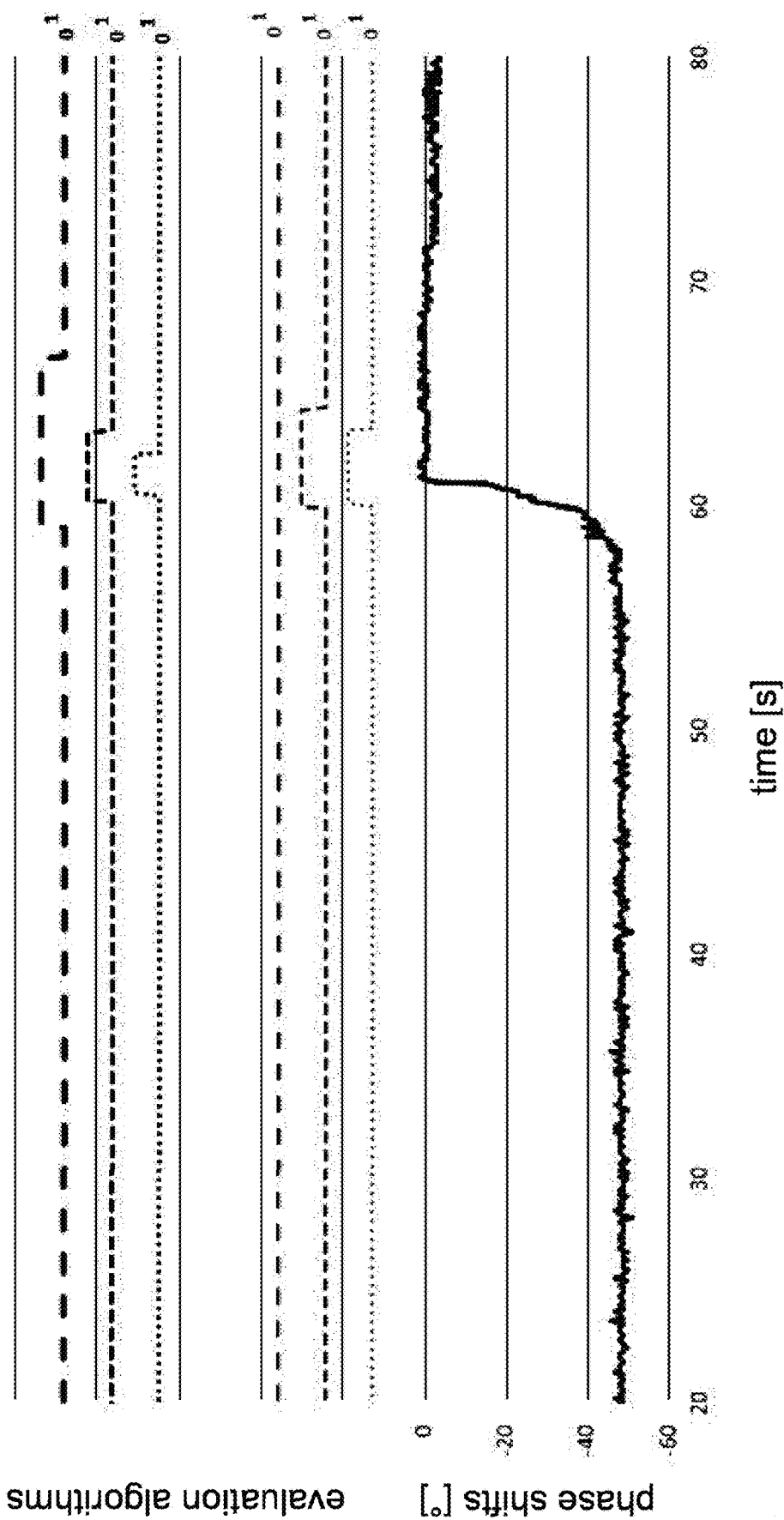
FIG. 7 shows a diagram illustrating the behaviour of detected phase shifts over operating time of the aerosol delivery device and indicating different evaluation algorithms for detecting the presence of fluid in the aerosol delivery device.

FIG. 7 shows a diagram illustrating the behaviour of detected phase shifts over operating time of the aerosol delivery device and indicating different evaluation algorithms for detecting the presence of fluid in the fluid reservoir 2. The solid line in this diagram constitutes the curve of the detected phase shifts as a function of this operating time and, thus, corresponds to the solid line shown in FIG. 6. The dashed lines and the dotted lines in FIG. 7 represent different evaluation algorithms. On the abscissa of FIG. 7, the operating time of the aerosol delivery device is given in seconds.

For the phase shift measurement shown in FIG. 7, the phase shift was repeatedly detected in the manner detailed above at a preset time interval of 100 ms. Thus, the phase shift was detected every 100 ms.

The transition from the state in which fluid is present in the fluid reservoir 2 to the state in which no fluid is present in the fluid reservoir 2 (see the abrupt increase of the solid line in FIG. 7) may occur over a time period in the range of 0.1 s to 10 s, in the range of 0.5 s to 7 s, in the range of 0.7 s to 6 s or in the range of 1 s to 5 s.

One or more of such evaluation algorithms may be stored in the evaluation unit 13a, e.g., in a memory, such as RAM and/or flash, of the evaluation unit 13a or realized by a discrete circuit. The evaluation unit 13a may comprise a processor, such as a CPU, a microcontroller and/or an operator which is configured to apply or perform one or more of such evaluation algorithms.

Each of the evaluation algorithms shown in FIG. 7 is configured to determine that no fluid is present in the fluid reservoir 2 if the first order derivative of the curve of the detected phase shifts (see the solid line in FIG. 7) exceeds a preset threshold value for a predetermined period of operating time of the aerosol delivery device. These evaluation algorithms differ from each other in the threshold value, as is indicated by the staggered arrangement of the dashed and dotted lines in FIG. 7. Specifically, an arrangement of an evaluation algorithm further up in FIG. 7, i.e., further away from the abscissa on which the operating time is given in seconds, indicates a higher threshold value. Moreover, the evaluation algorithms also differ from each other with regard to the period of operating time over which the threshold value has to be exceeded for determination that no fluid is present in the fluid reservoir 2. This latter difference is indicated by the different widths, along the abscissa of FIG. 7, of the substantially rectangular peaks of the dashed and dotted lines in FIG. 7 at which the dashed and dotted lines rise from "0" to "1" (see the right-hand side of FIG. 7). The denotation "1" indicates that the first order derivative of the curve of the detected phase shifts exceeds the preset threshold value, while the denotation "0" indicates that the first order derivative of the curve of the detected phase shifts does not exceed the preset threshold value.

One, some or all of the evaluation algorithms may be configured so as to repeatedly determine, at a preset time interval, whether the preset threshold value has been exceeded. The preset time interval may be in the range of 0.1 s to 20 s, in the range of 0.2 s to 15 s or in the range of 0.3 s to 10 s. In particular, the preset time interval may be 2 s, 3 s, 4 s, 4.5 s or 8 s. The preset threshold value may be 10° or more, 20° or more, 40° or more or 60° or more, e.g., over a unit time period, such as 100 ms. The preset threshold value may be in the range of 2° to 358°, in the range of 5° to 300° or in the range of 10° to 200°, e. g., over a unit time period, such as 100 ms. The preset threshold value may be in the range of 10° to 350°, in the range of 20° to 300° or in the range of 60° to 200°, e.g., over a unit time period, such as 100 ms.

The evaluation algorithms illustrated in FIG. 7 may be used alone or in combination with each other. For example, a single evaluation algorithm can be used to detect the presence of fluid in the fluid reservoir 2. Alternatively, two or more of these algorithms together may be employed for this purpose. For example, it may be determined that no fluid is present in the fluid reservoir 2 only if each of the algorithms used indicates the absence of fluid.

Figure 5:
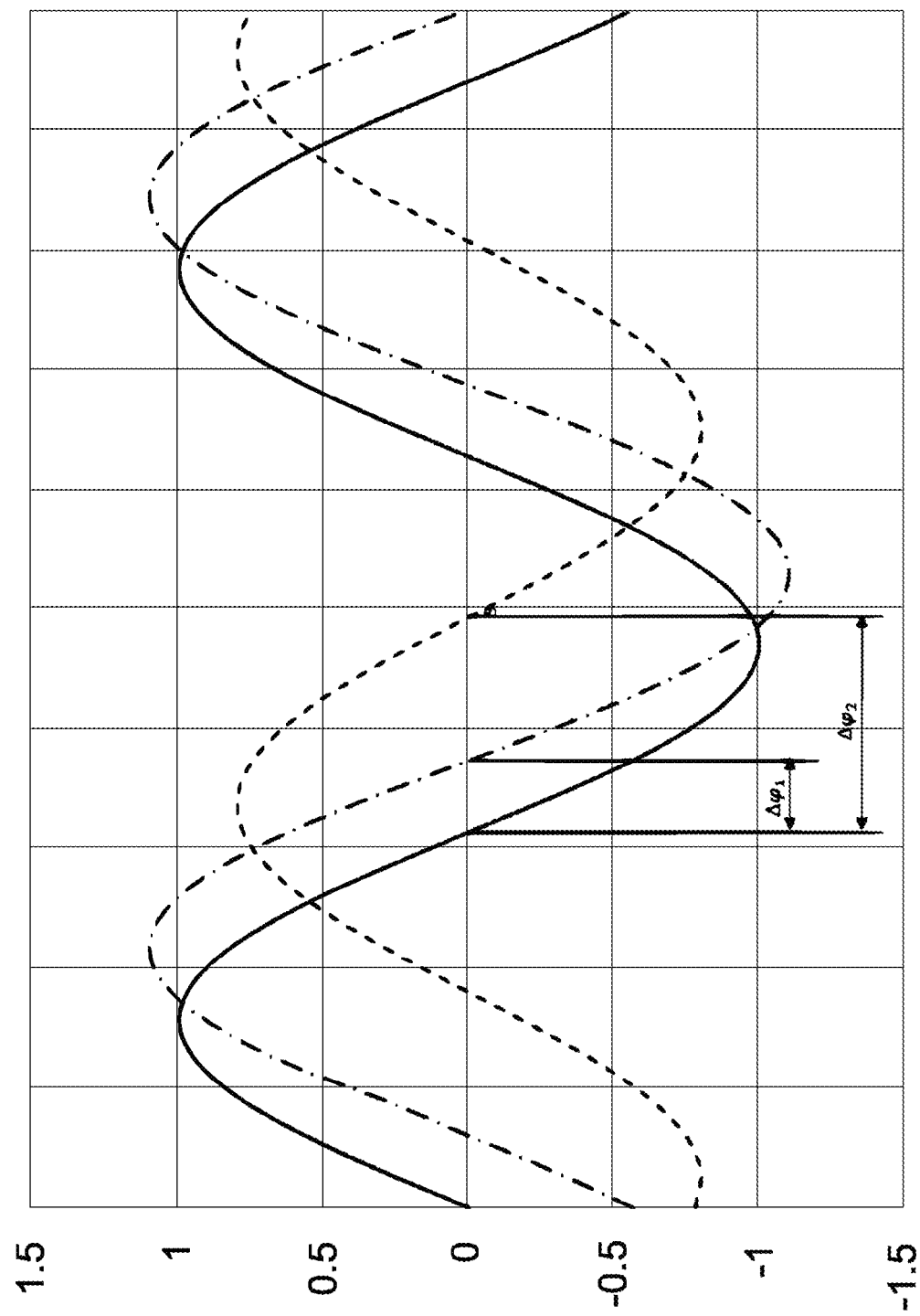
FIG. 5 shows another diagram illustrating phase shifts for two different fill states of the aerosol delivery device.

As has been detailed above, in the embodiment illustrated in FIGS. 5 to 7, the presence of fluid in contact with the membrane 1 and/or in the fluid reservoir 2 is detected on the basis of the first order derivative, i.e., the slope or gradient, of the curve of the measured phase shifts as a function of operating time of the aerosol delivery device. However, in other embodiments, the presence of fluid may be determined on the basis of the phase shift in various other ways, as will be detailed in the following.

For example, the presence of fluid in contact with the membrane 1 and/or in the fluid reservoir 2 may be detected on the basis of the length of the curve of the detected phase shifts as a function of operating time of the aerosol delivery device. Herein, the term "length of the curve" is defined as the sum of the distances between neighbouring or adjacent detected values of the phase shift. Thus, neighbouring or adjacent detected phase shift values are connected with each other by straight lines and the lengths of these straight lines are summed up to obtain the length of the curve.

The presence of fluid in contact with the membrane 1 and/or in the fluid reservoir 2 may be detected on the basis of a cross-correlation of the curve of the detected phase shifts as a function of operating time of the aerosol delivery device with a reference curve. The reference curve may be formed as a production median value or in a simplified manner (simplified curve).

The presence of fluid in contact with the membrane 1 and/or in the fluid reservoir 2 may be detected on the basis of the difference obtained by subtracting the curve of the detected phase shifts as a function of operating time of the aerosol delivery device obtained in one detection cycle, e.g., a first detection cycle, from the curve of the detected phase shifts as a function of operating time of the aerosol delivery device obtained in another detection cycle, e.g., a second detection cycle. The difference may be obtained by subtracting the curves of two consecutive or successive detection cycles. Herein, the term "detection cycle" defines a cycle of detection or measurement in which the phase shift is detected as a function of operating time of the aerosol delivery device.

The presence of fluid in contact with the membrane 1 and/or in the fluid reservoir 2 may be detected on the basis of the area under the curve of the detected phase shifts as a function of operating time of the aerosol delivery device. The area under the curve may be the area between the curve and a straight line between the first detected phase shift value and the last detected phase shift value, i.e., between the first and last points of the curve.

The presence of fluid in contact with the membrane 1 and/or in the fluid reservoir 2 may be detected on the basis of a Fourier transformation of the curve of the detected phase shifts as a function of operating time of the aerosol delivery device. By Fourier transformation, a function of time is transformed into a new frequency dependent function, i.e., a function whose argument is frequency, and vice versa.

In each of the above-identified embodiments, low pass filtering may be performed on the curves of the detected phase shifts as a function of operating time of the aerosol delivery device, so as to eliminate high-frequency background noise in the measurements.

FIG. 8 shows a flow diagram illustrating an embodiment of the method of operating an aerosol delivery device according to the present invention. In this embodiment, the control unit B, in particular, the evaluation unit 13a thereof (see FIG. 1), is configured to perform the steps shown in FIG. 8 in order to detect the presence of fluid in contact with the membrane 1 and/or in the fluid reservoir 2 on the basis of the phase shift detected by the phase detector 13.

At the start of the evaluation process, in a first step S1, the presence of fluid in contact with the membrane 1 and/or in the fluid reservoir 2 is detected.

This first detection step S1 may be performed on the basis of at least one electrical parameter of the vibrator 7 detected by an electrical parameter sensor (not shown), as has been detailed above. The at least one electrical parameter may be the voltage and/or the current and/or the power. The detection process based on the at least one electrical parameter may be carried out, e.g., in the manner described in EP 1 558 315 A1 and/or in the manner described in WO 2015/091356 A1. For example, the controller 10 may be configured so that, when detection on the basis of the at least one electrical parameter is carried out in step S1, it sequentially operates the vibrator 7 at a plurality of different vibration frequencies. The electrical parameter sensor may be configured to detect the at least one electrical parameter of the vibrator 7 for each of the plurality of different vibration frequencies. The evaluation unit 13a may be configured to detect the presence of fluid in contact with the membrane 1 and/or in the fluid reservoir 2 on the basis of the dependence of the detected values of the at least one electrical parameter on the vibration frequency.

In addition or as an alternative, the first detection step S1 may be performed on the basis of the temperature of the vibrator 7 and/or the membrane 2 detected by a temperature sensor (not shown), as has been detailed above.

If it is determined in the first detection step S1 that no fluid in contact with the membrane 1 and/or in the fluid reservoir 2 is present, operation of the aerosol delivery device is stopped (see FIG. 8). Otherwise, if the presence of fluid is detected, step S2 is performed.

In other embodiments, step S1 may be omitted. In this case the method starts directly with step S2.

In step S2, the phase shift (such as the phase shifts $\Delta\varphi_1$ and $\Delta\varphi_2$ shown in FIG. 5) is repeatedly detected, for example, in the manner detailed above for the embodiment of FIG. 5, at a preset time interval. The time interval may be, e.g., in the range of 50 ms to 150 ms. For example, the time interval may be 100 ms, so that the phase shift is detected every 100 ms. In a subsequent step S3, the last x detected phase shift values are added together so as to obtain the sum of these values. Here, “x” is an integral number. The number “x” may be, e.g., in the range of 10 to 30. For example, x may be 20.

In a following step S4, it is checked whether the time which has passed since the start of the evaluation process is less than a preset threshold. This threshold may be, e.g., in the range of 10 to 20 s. For example, the threshold may be 15 s. If the time since the start of the evaluation process is less than the threshold, steps S2 to S4 are repeated (see FIG. 8). In this way, it can be reliably ensured that the aerosol delivery device reaches a stable operation state.

If the time since the start of the evaluation process is more than the threshold, step S5 is performed. In this latter step, the difference between the current value of the sum obtained by adding up the phase shift values in step S3 and the previous value of the sum obtained by adding up the phase shift values in step S3, i.e., the previous value at a time period of $t_1$ seconds ago, is determined. Specifically, this difference is obtained by subtracting the latter sum value from the former sum value. The time period $t_1$ may be in the range of 1 to 3 s. For example, the time period $t_1$ may be 2 S.

In a subsequent step S6, it is determined whether the difference obtained in step S5 is greater than a preset threshold. If this is the case, a flag 1 is set in step S7. Otherwise, flag 1 is not set.

In a following step S8, the difference between the current value of the sum obtained by adding up the phase shift values in step S3 and the previous value of the sum obtained by adding up the phase shift values in step S3, i.e., the previous value at a time period of $t_2$ seconds ago, is determined. Specifically, this difference is obtained by subtracting the latter sum value from the former sum value.

The time period $t_2$ may be in the range of 3 to 7 s. For example, the time period $t_2$ may be 5 s.

Subsequently, in a step S9, it is determined whether the difference obtained in step S8 is greater than a preset threshold. If this is the case, a flag 2 is set in step S10. Otherwise, flag 2 is not set.

Then, in a step S11, the difference between the current value of the sum obtained by adding up the phase shift values in step S3 and the previous value of the sum obtained by adding up the phase shift values in step S3, i.e., the previous value at a time period of $t_3$ seconds ago, is determined. Specifically, this difference is obtained by subtracting the latter sum value from the former sum value. The time period $t_3$ may be in the range of 5 to 15 s. For example, the time period $t_3$ may be 10 s.

Afterwards, in step S12, it is determined whether the difference obtained in step S11 is greater than a preset threshold $l_1$. If this is the case, a flag 3 is set in step S13. Otherwise, flag 3 is not set.

In a following step S14, the difference between the current value of the sum obtained by adding up the phase shift values in step S3 and the previous value of the sum obtained by adding up the phase shift values in step S3, i.e., the previous value at a time period of $t_4$ seconds ago, is determined. Specifically, this difference is obtained by subtracting the latter sum value from the former sum value. The time period $t_4$ may be in the range of 5 to 15 s. For example, the time period $t_4$ may be 10 s.

Subsequently, in a step S15, it is determined whether the difference obtained in step S14 is greater than a preset threshold 12. If this is the case, a flag 4 is set in step S16. Otherwise, flag 4 is not set.

The threshold $l_1$ in step S12 is different from the threshold 12 in step S15. Preferably, the threshold $l_1$ is larger than the threshold $l_2$.

In the present embodiment, four processes of comparing a difference of sum values with a threshold and four corresponding flags, i.e., the flags 1 to 4, are used. However, in other embodiments, the number of these processes and the corresponding flags may be smaller or larger.

In a subsequent step S17, it is determined whether a first combination of set flags, termed “flag combination 1” in FIG. 8, is present, i.e., whether these flags have been set in the respective steps S7, S10, S13 and S16. For flag combination 1, all possible combinations of set flags may be used. For example, flag combination 1 may be constituted by a combination of set flags 1 and 2, a combination of set flags 1 and 3, a combination of set flags 1 and 4 or a combination of set flags 2 and 3. For flag combination 1 to be present, it may be required that the respective flags are set at the same time, i.e., in the same sequence of steps S2 to S16. Flag combination 1 may be constituted by a single set flag which has been set multiple times, i.e., in a plurality of sequences of steps S2 to S16. The single set flag may be flag 3 or flag 4, preferably flag 4. For flag combination 1 to be present, the single flag may have to have been set, e.g., three times, four times, five times, six times or seven times.

If flag combination 1 is found to be present in step S17, a confirmation or verification is performed once in a step S18. This confirmation or verification may be carried out in the same manner as the detection step S1 described above. In particular, in step S18, the presence of fluid in contact with the membrane 1 and/or in the fluid reservoir 2 may be detected on the basis of at least one electrical parameter of the vibrator 7, e.g., in the manner disclosed in EP 1 558 315 A1 and/or in the manner disclosed in WO 2015/091356 A1, and/or on the basis of the temperature of the vibrator 7 and/or the membrane 2.

Alternatively, step S18 may be performed in a different manner than step S1. For example, in step S1, the presence of fluid in contact with the membrane 1 and/or in the fluid reservoir 2 may be detected on the basis of at least one electrical parameter of the vibrator 7, e.g., in the manner disclosed in EP 1 558 315 A1 and/or in the manner disclosed in WO 2015/091356 A1, and in step S18, the presence of fluid in contact with the membrane 1 and/or in the fluid reservoir 2 may be detected on the basis of the temperature of the vibrator 7 and/or the membrane 2. As a further alternative, in step S18, the presence of fluid in contact with the membrane 1 and/or in the fluid reservoir 2 may be detected on the basis of at least one electrical parameter of the vibrator 7, e.g., in the manner disclosed in EP 1 558 315 A1 and/or in the manner disclosed in WO 2015/091356 A1, and in step S1, the presence of fluid in contact with the membrane 1 and/or in the fluid reservoir 2 may be detected on the basis of the temperature of the vibrator 7 and/or the membrane 2.

If it is confirmed in step S18 that no fluid in contact with the membrane 1 and/or in the fluid reservoir 2 is present, operation of the aerosol delivery device is stopped (see FIG. 8). Otherwise, if the presence of fluid is detected in step S18, a new sequence of steps, beginning with step S2, is started, as is shown in FIG. 8.

If it is determined in step S17 that flag combination 1 is not present, a step S19 is carried out.

In step S19, it is determined whether a second combination of set flags, termed "flag combination 2" in FIG. 8, is present. For flag combination 2, all possible combinations of set flags may be used. For example, flag combination 2 may be constituted by a combination of set flags 1 and 4, a combination of set flags 2 and 4 or a combination of set flags 3 and 4. For flag combination 2 to be present, it may be required that the respective flags are set at the same time, i.e., in the same sequence of steps S2 to S16. Flag combination 2 may be constituted by a single set flag which has been set multiple times, i.e., in a plurality of sequences of steps S2 to S16. The single set flag may be flag 3 or flag 4, preferably flag 4. For flag combination 2 to be present, the single flag may have to have been set, e.g., three times, four times, five times, six times or seven times.

If flag combination 2 is found to be present in step S19, a confirmation or verification is performed multiple times, e.g., twice, three times or four times, in step S20. This confirmation or verification step S20 may be carried out substantially in the same manner as the confirmation or verification step S18 described above, with the difference that step S18 is carried out only once. Alternatively, step S20 may be carried out in a different manner than step S18. In step S20, the presence of fluid in contact with the membrane 1 and/or in the fluid reservoir 2 may be detected, multiple times, on the basis of at least one electrical parameter of the vibrator 7, e.g., in the manner disclosed in EP 1 558 315 A1 and/or in the manner disclosed in WO 2015/091356 A1, and/or on the basis of the temperature of the vibrator 7 and/or the membrane 2, as has been detailed above.

If it is confirmed multiple times, e.g., twice, three times or four times, in step S20 that no fluid in contact with the membrane 1 and/or in the fluid reservoir 2 is present, operation of the aerosol delivery device is stopped (see FIG. 8). Otherwise, if the presence of fluid is detected in step S20, a new sequence of steps, beginning with step S2, is started, as is shown in FIG. 8.

Further, if it is determined in step S19 that flag combination 2 is not present, a new sequence of steps, beginning with step S2, is started (see FIG. 8).

By adopting the method of the embodiment illustrated in FIG. 8, a particularly high detection accuracy can be achieved. In particular, the risk of an erroneous determination that no fluid to be aerosolised is present in the fluid reservoir 2 can be minimised or even eliminated.

In other embodiments, one or both of the confirmation steps S18 and S20 may be omitted. In this case, operation of the aerosol delivery device may be stopped if the presence of flag combination 1 is determined in step S17 or the presence of flag combination 2 is determined in step S19.

The invention claimed is:

1. An aerosol delivery device comprising:
   an aerosol generator for generating an aerosol in the aerosol delivery device, the aerosol generator comprising:
   a membrane, and
   a vibrator which is configured to vibrate a fluid and to aerosolise the fluid by the membrane,
   a fluid reservoir for receiving the fluid to be aerosolised, the fluid reservoir being arranged in fluid communication with the membrane,
   a controller which is configured to operate the vibrator, by supplying an electrical drive signal to the vibrator, so as to vibrate the fluid and to aerosolize the fluid by the membrane,
   a phase detector which is configured to detect a phase shift of the drive signal caused by an increase in a temperature of the vibrator from a lack of fluid in the fluid reservoir, wherein the phase shift of the drive signal is a phase shift between a voltage component of the drive signal and a reference signal, or the phase shift of the drive signal is a phase shift between a current component of the drive signal and a reference signal, and
   an evaluation unit which is configured to detect the presence of fluid in contact with the membrane and/or in the fluid reservoir on the basis of the phase shift detected by the phase detector.

2. The aerosol delivery device according to claim 1, wherein the vibrator comprises a piezoelectric element.

3. The aerosol delivery device according to claim 1, wherein the controller is configured to operate the vibrator at a constant vibration frequency.

4. The aerosol delivery device according to claim 1, wherein the phase shift of the drive signal is a current and/or voltage phase shift of the drive signal.

5. The aerosol delivery device according to claim 1, wherein the reference signal is determined at a resistor arranged in electrical connection between controller and vibrator, or the reference signal is determined at an input of the controller.

6. The aerosol delivery device according to claim 1, wherein the phase detector is configured to periodically perform detection of the phase shift of the drive signal.

7. The aerosol delivery device according to claim 6, wherein the phase detector is configured to periodically perform detection of the phase shift of the drive signal at a detection frequency of 0.1 Hz or more.

8. The aerosol delivery device according to claim 1, wherein the phase detector is configured to perform detection of the phase shift of the drive signal during aerosolisation of the fluid by the membrane.

9. The aerosol delivery device according to claim 1, wherein the controller is configured to deactivate the vibrator if no presence of fluid in contact with the membrane and/or in the fluid reservoir is detected by the evaluation unit.

10. The aerosol delivery device according to claim 1, wherein the membrane is a passive membrane and the vibrator is configured to vibrate a fluid supply system and/or a membrane back space of the aerosol delivery device.

11. The aerosol delivery device according to claim 1, wherein the membrane is an active membrane and the vibrator is configured to vibrate the membrane.

12. The aerosol delivery device according to claim 1, further comprising an indication signal emitting means, wherein the aerosol delivery device is configured so that the indication signal emitting means emits an indication signal if the evaluation unit detects that no fluid in contact with the membrane and/or in the fluid reservoir is present.

13. The aerosol delivery device according to claim 1, wherein a change in phase shift of the driving signal when the fluid is exhausted is ±5° or more.

14. A method of operating an aerosol delivery device, the aerosol delivery device comprising:
   an aerosol generator for generating an aerosol in the aerosol delivery device, the aerosol generator comprising;
   a membrane,
   a vibrator which is configured to vibrate a fluid and to aerosolise the fluid by the membrane,
   a fluid reservoir for receiving the fluid to be aerosolised, the fluid reservoir being arranged in fluid communication with the membrane, and
   the method comprising the steps of:
   operating the vibrator, by supplying an electrical drive signal to the vibrator, so as to vibrate the fluid and to aerosolize the fluid by the membrane,
   detecting a phase shift of the drive signal caused by an increase in a temperature of the vibrator from a lack of fluid in the fluid reservoir, wherein the phase shift of the drive signal is a phase shift between a voltage component of the drive signal and a reference signal, or the phase shift of the drive signal is a phase shift between a current component of the drive signal and a reference signal, and detecting the presence of fluid in contact with the membrane and/or in the fluid reservoir on the basis of the detected phase shift.

15. The method of operating the aerosol delivery device according to claim 14, wherein the aerosol delivery device further comprises:
   a controller which is configured to operate the vibrator, by supplying the electrical drive signal to the vibrator, so as to vibrate the fluid,
   a phase detector which is configured to detect the phase shift of the drive signal, and
   an evaluation unit which is configured to detect the presence of fluid in contact with the membrane and/or in the fluid reservoir on the basis of the phase shift detected by the phase detector.

\* \* \* \* \*